(12) United States Patent
Frank et al.

(10) Patent No.: US 11,055,532 B2
(45) Date of Patent: *Jul. 6, 2021

(54) SYSTEM AND METHOD OF REPRESENTING AND TRACKING TIME-BASED INFORMATION IN TWO-DIMENSIONAL BUILDING DOCUMENTATION

(71) Applicant: FARO Technologies, Inc., Lake Mary, FL (US)

(72) Inventors: Aleksej Frank, Stuttgart (DE); Oliver Zweigle, Stuttgart (DE); Ahmad Ramadneh, Kornwestheim (DE); Joao Santos, Kornwestheim (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/396,857

(22) Filed: Apr. 29, 2019

(65) Prior Publication Data
US 2019/0340433 A1 Nov. 7, 2019

Related U.S. Application Data

(60) Provisional application No. 62/665,651, filed on May 2, 2018.

(51) Int. Cl.
| | | |
|---|---|---|
| *G06K 9/00* | (2006.01) | |
| *G01C 21/32* | (2006.01) | |
| *G06T 7/70* | (2017.01) | |
| *G06T 17/05* | (2011.01) | |
| *G06T 11/20* | (2006.01) | |

(Continued)

(52) U.S. Cl.
CPC ........ *G06K 9/00671* (2013.01); *G01C 21/32* (2013.01); *G06K 9/00637* (2013.01); *G06K 9/00664* (2013.01); *G06T 7/70* (2017.01); *G06T 7/75* (2017.01); *G06T 11/206* (2013.01); *G06T 17/05* (2013.01); *G01S 17/89* (2013.01)

(58) Field of Classification Search
None
See application file for complete search history.

(56) References Cited

U.S. PATENT DOCUMENTS

| | | |
|---|---|---|
| 6,246,468 B1 | 6/2001 | Dimsdale |
| 6,542,249 B1 | 4/2003 | Kofman et al. |

(Continued)

*Primary Examiner* — Feng Niu
(74) *Attorney, Agent, or Firm* — Cantor Colburn LLP

(57) ABSTRACT

A system that includes computer executable instructions that, when executed by the processor, cause the processor to perform operations including receiving a first 2D map of a location. The first 2D map was generated at a first time based on first scan data from a coordinate measurement scanner and a portable computing device. The coordinate measurement scanner includes a light source, a first image sensor, and a controller. The portable computing device includes a second image sensor. A second 2D map of the location is received. The second 2D map was generated at a second time based on second scan data from the coordinate measurement scanner and the portable computing device. The first 2D map is aligned with the second 2D map, and their contents are compared. Any differences in the contents of the first 2D map and the second 2D map are output.

20 Claims, 34 Drawing Sheets

(51) Int. Cl.
*G06T 7/73* (2017.01)
*G01S 17/89* (2020.01)

(56) References Cited

U.S. PATENT DOCUMENTS

| | | | |
|---|---|---|---|
| 6,748,112 B1 * | 6/2004 | Nguyen | F01D 21/003 |
| | | | 348/92 |
| 7,069,124 B1 | 6/2006 | Whittaker et al. | |
| 7,327,857 B2 * | 2/2008 | Lloyd, Jr. | G01B 11/2522 |
| | | | 382/106 |
| 8,019,042 B2 * | 9/2011 | Shukla | G06T 7/0016 |
| | | | 378/65 |
| 8,384,914 B2 | 2/2013 | Becker et al. | |
| 8,447,069 B2 * | 5/2013 | Huang | G06T 7/254 |
| | | | 382/103 |
| 8,467,992 B1 * | 6/2013 | Doyle | G01S 7/4808 |
| | | | 702/167 |
| 8,625,106 B2 | 1/2014 | Ossig et al. | |
| 8,699,005 B2 * | 4/2014 | Likholyot | G01C 15/002 |
| | | | 356/3.1 |
| 8,699,007 B2 | 4/2014 | Becker et al. | |
| 8,699,036 B2 | 4/2014 | Ditte et al. | |
| 8,705,012 B2 | 4/2014 | Greiner et al. | |
| 8,705,016 B2 | 4/2014 | Schumann et al. | |
| 8,705,893 B1 * | 4/2014 | Zhang | G06T 7/74 |
| | | | 382/285 |
| 8,730,477 B2 | 5/2014 | Ruhland et al. | |
| 8,811,767 B2 | 8/2014 | Veeraraghaven et al. | |
| 8,830,485 B2 | 9/2014 | Woloschyn | |
| 8,896,819 B2 | 11/2014 | Schumann et al. | |
| 8,970,823 B2 | 3/2015 | Heidemann et al. | |
| 9,074,883 B2 | 7/2015 | Schumann et al. | |
| 9,279,662 B2 | 3/2016 | Steffey et al. | |
| 9,329,271 B2 | 5/2016 | Ossig et al. | |
| 9,342,890 B2 | 5/2016 | Becker et al. | |
| 9,372,265 B2 | 6/2016 | Zweigle et al. | |
| 9,417,316 B2 | 8/2016 | Schumann et al. | |
| 9,513,107 B2 | 12/2016 | Zweigle et al. | |
| 9,599,455 B2 | 3/2017 | Heidemann et al. | |
| 9,618,620 B2 | 4/2017 | Zweigle et al. | |
| 9,739,886 B2 | 8/2017 | Zweigle et al. | |
| 9,746,559 B2 | 8/2017 | Zweigle et al. | |
| 9,756,263 B2 * | 9/2017 | Kester | G06K 9/22 |
| 9,977,978 B2 * | 5/2018 | Coulter | G06K 9/0063 |
| 10,025,798 B2 * | 7/2018 | Kaminka | G06F 16/9537 |
| 10,084,975 B2 * | 9/2018 | Kester | G01N 21/3504 |
| 10,210,285 B2 | 2/2019 | Wong et al. | |
| 10,269,135 B2 * | 4/2019 | Chen | G06T 7/194 |
| 10,275,894 B2 * | 4/2019 | Saini | G06T 7/254 |
| 10,282,854 B2 | 5/2019 | Zweigle et al. | |
| 10,303,966 B2 * | 5/2019 | Coulter | G06T 3/0093 |
| 10,339,384 B2 | 7/2019 | Lorenzo | |
| 10,388,018 B2 * | 8/2019 | Nakagomi | G06T 7/0016 |
| 10,460,173 B2 * | 10/2019 | Sasson | G06F 16/2379 |
| 10,657,691 B2 * | 5/2020 | Zweigle | G06T 7/74 |
| 10,746,980 B2 * | 8/2020 | Kenny | G01N 21/274 |
| 10,776,936 B2 * | 9/2020 | Fan | G06T 7/38 |
| 2004/0027347 A1 | 2/2004 | Farsaie | |
| 2006/0110026 A1 | 5/2006 | Strassenburg-Kleciak | |
| 2009/0323121 A1 | 12/2009 | Valkenburg et al. | |
| 2010/0134596 A1 | 6/2010 | Becker | |
| 2011/0288684 A1 | 11/2011 | Farlow et al. | |
| 2012/0069352 A1 | 3/2012 | Ossig et al. | |
| 2013/0314688 A1 * | 11/2013 | Likholyot | G01S 17/48 |
| | | | 356/3.1 |
| 2014/0016114 A1 | 1/2014 | Lopez et al. | |
| 2014/0063489 A1 | 3/2014 | Steffey et al. | |
| 2014/0078519 A1 | 3/2014 | Steffey et al. | |
| 2014/0226190 A1 | 8/2014 | Bridges et al. | |
| 2014/0240690 A1 | 8/2014 | Newman et al. | |
| 2014/0300906 A1 | 10/2014 | Becker et al. | |
| 2014/0362424 A1 | 12/2014 | Bridges et al. | |
| 2015/0085068 A1 | 3/2015 | Becker et al. | |
| 2015/0085301 A1 | 3/2015 | Becker et al. | |
| 2015/0086070 A1 * | 3/2015 | Deng | G06T 3/0068 |
| | | | 382/100 |
| 2015/0160342 A1 | 6/2015 | Zweigle et al. | |
| 2015/0160347 A1 | 6/2015 | Zweigle et al. | |
| 2016/0047914 A1 | 2/2016 | Zweigle et al. | |
| 2016/0170197 A1 * | 6/2016 | Kenny | G01N 21/6458 |
| | | | 348/79 |
| 2016/0282107 A1 | 9/2016 | Roland et al. | |
| 2018/0012125 A1 * | 1/2018 | Ladha | G01S 17/89 |
| 2018/0100927 A1 | 4/2018 | Zweigle et al. | |
| 2018/0285482 A1 | 10/2018 | Santos et al. | |
| 2020/0301440 A1 * | 9/2020 | Ferguson | G05D 1/0257 |
| 2020/0334832 A1 * | 10/2020 | Den Hollander | G06T 7/254 |

\* cited by examiner

SYSTEM AND METHOD OF REPRESENTING AND TRACKING TIME-BASED INFORMATION IN TWO-DIMENSIONAL BUILDING DOCUMENTATION

CROSS-REFERENCE TO RELATED APPLICATION

This application claims the benefit of U.S. Provisional Application No. 62/665,651, filed May 2, 2018, and entitled "A SYSTEM AND METHOD OF REPRESENTING AND TRACKING TIME-BASED INFORMATION IN TWO-DIMENSIONAL BUILDING DOCUMENTATION", the content of which is incorporated herein by reference in its entirety.

BACKGROUND

The present application is directed to a system that optically scans an environment at a plurality of different points in time and identifies differences between the environments at the different points in time.

The automated creation of digital 2D floorplans for existing structures is desirable as it allows the size and shape of the environment to be used in many processes. For example, a floorplan may be desirable to allow construction drawings to be prepared during a renovation. Such floorplans may find other uses such as in documenting a building for a fire department or to document a crime scene, in the planning of construction or remodeling of a building, and the like.

Existing measurement systems typically use a scanning device that determines coordinates of surfaces in the environment by emitting a light and capturing a reflection to determine a distance, or by triangulation using cameras. These scanning devices are mounted to a movable structure, such as a cart, and moved through the building to generate a digital representation of the building. These systems tend to be more complex and require specialized personnel to perform the scan. Further, the scanning equipment including the movable structure may be bulky, which could further delay the scanning process in time sensitive situations, such as a crime or accident scene investigation.

In addition, human input is required to add context to digital 2D floorplans and to compare contents of one digital 2D floorplan to another and thus, current methods of manually labeling and comparing digital 2D floorplans can be time-consuming.

Accordingly, while existing scanning systems are suitable for their intended purposes, what is needed is a system for having certain features of embodiments of the present invention.

BRIEF DESCRIPTION

According to one aspect of the invention, a system of comparing two-dimensional (2D) maps of an environment is provided. The system includes a processor and a memory that includes computer executable instructions that, when executed by the processor, cause the processor to perform operations that include receiving a first 2D map of a location. The first 2D map was generated at a first time based at least in part on first scan data from a coordinate measurement scanner and a portable computing device. The coordinate measurement scanner includes a light source, a first image sensor, and a controller. The portable computing device includes a second image sensor. A second 2D map of the location is received. The second 2D map was generated at a second time based at least in part on second scan data from the coordinate measurement scanner and the portable computing device. The first 2D map is aligned with the second 2D map, and their contents are compared. Any differences in the contents of the first 2D map and the second 2D map are output.

According to an embodiment of the present invention, a method for comparing two-dimensional (2D) maps of an environment is provided. The method includes receiving a first 2D map of a location. The first 2D map was generated at a first time based at least in part on first scan data from a coordinate measurement scanner and a portable computing device. The coordinate measurement scanner includes a light source, a first image sensor, and a controller. The portable computing device includes a second image sensor. A second 2D map of the location is received. The second 2D map was generated at a second time based at least in part on second scan data from the coordinate measurement scanner and the portable computing device. The first 2D map is aligned with the second 2D map, and their contents are compared. Any differences in the contents of the first 2D map and the second 2D map are output.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
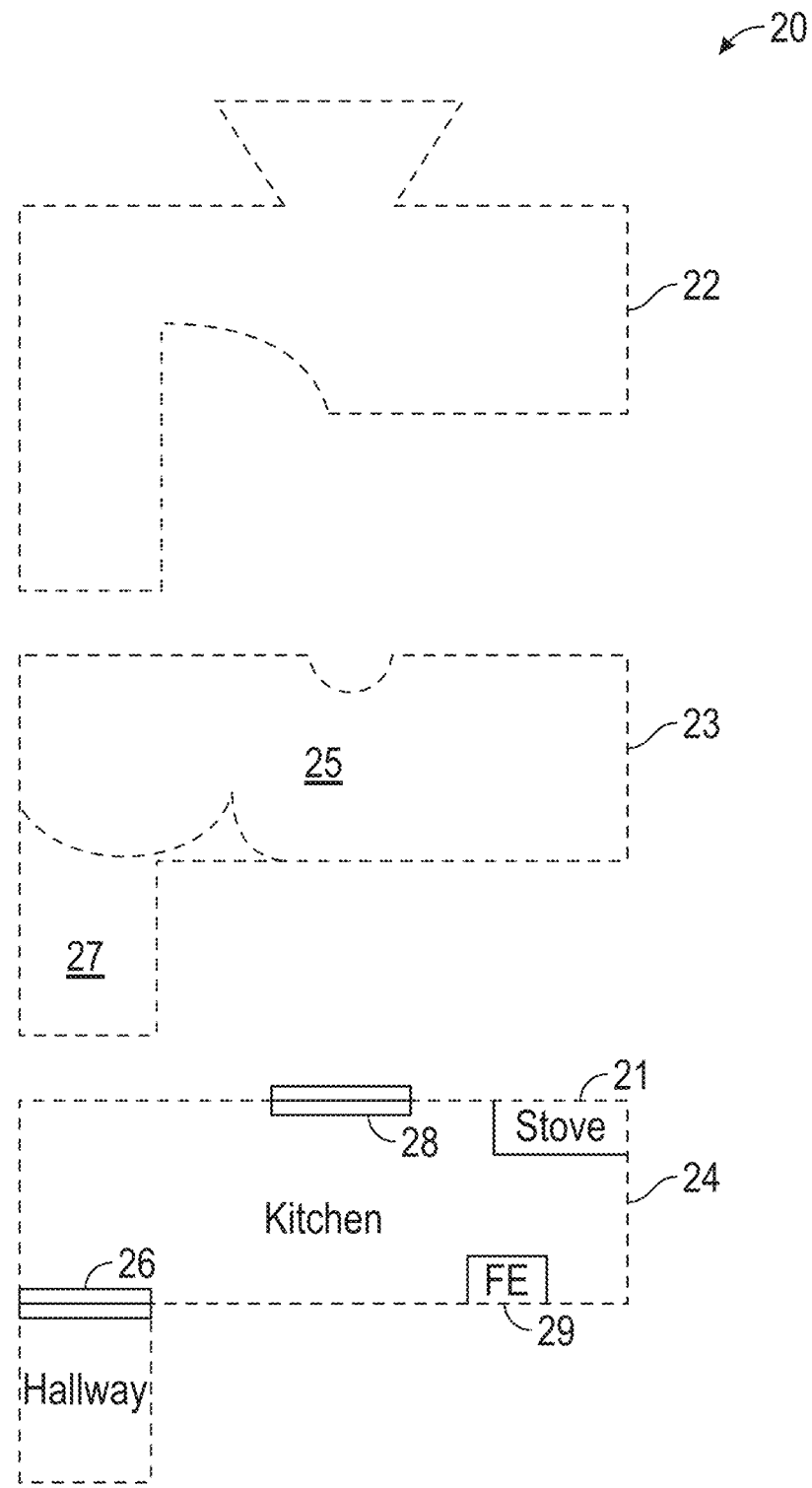
FIG. 1 is an illustration of two-dimensional (2D) maps of an area generated by a mapping system in accordance with an embodiment.
Figure 2:
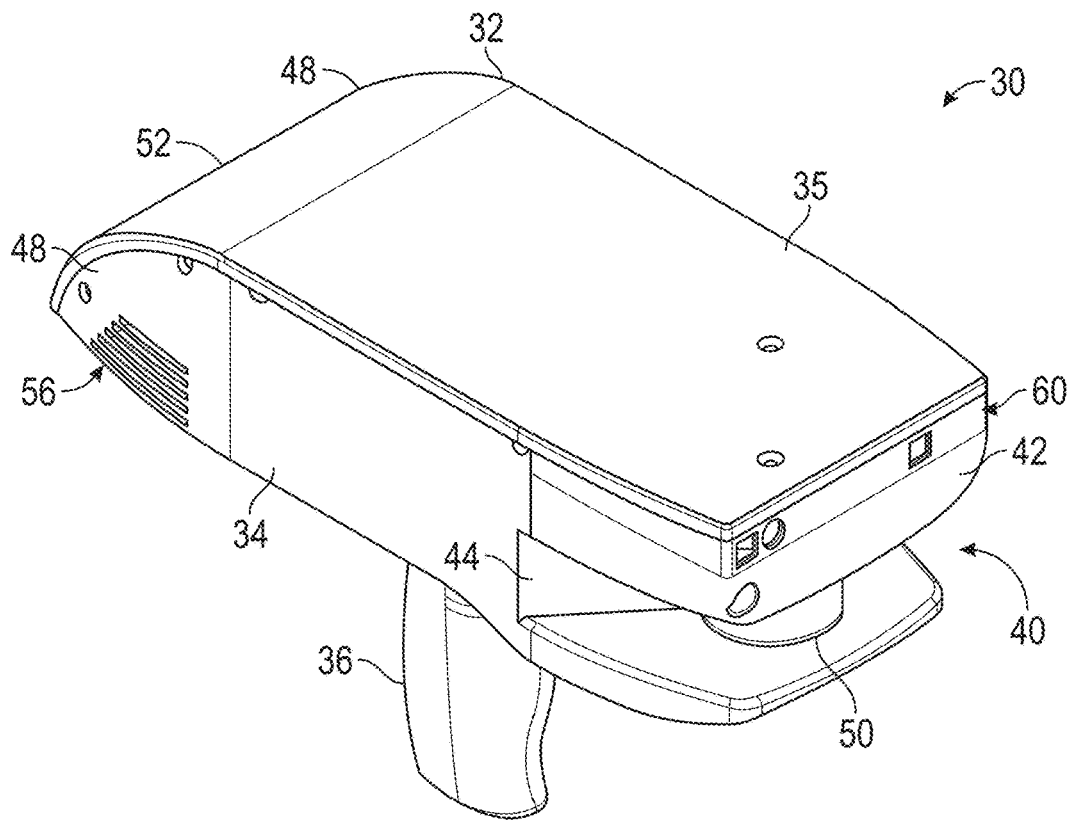
FIGS. 2-4 are perspective views of a scanning and mapping system in accordance with an embodiment.
Figure 3:
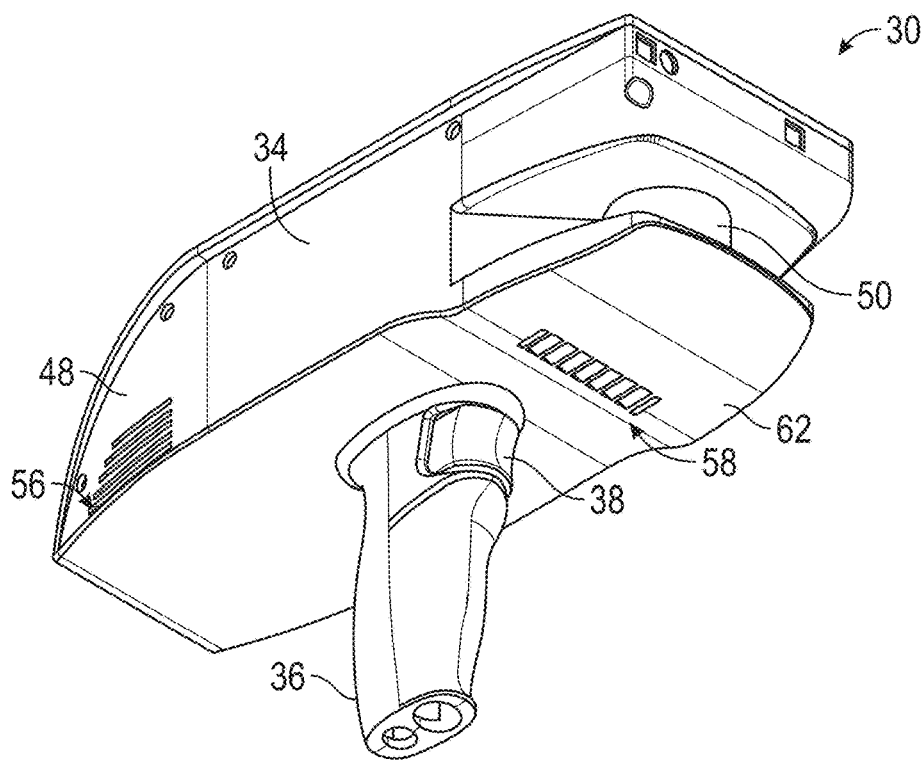
Figure 4:
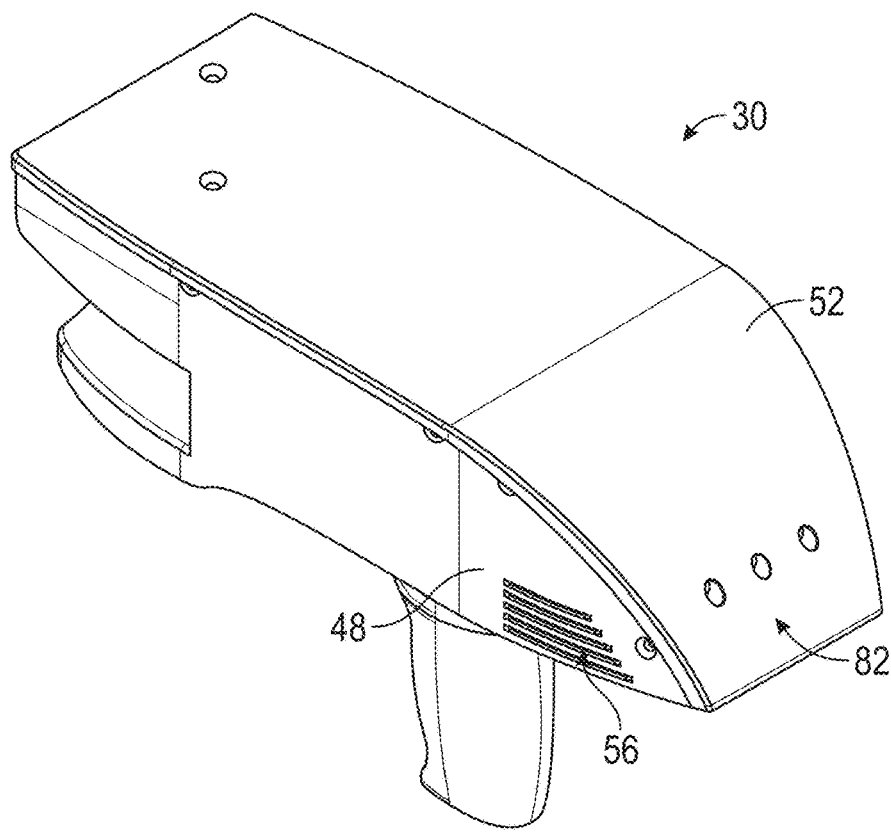
Figure 5:
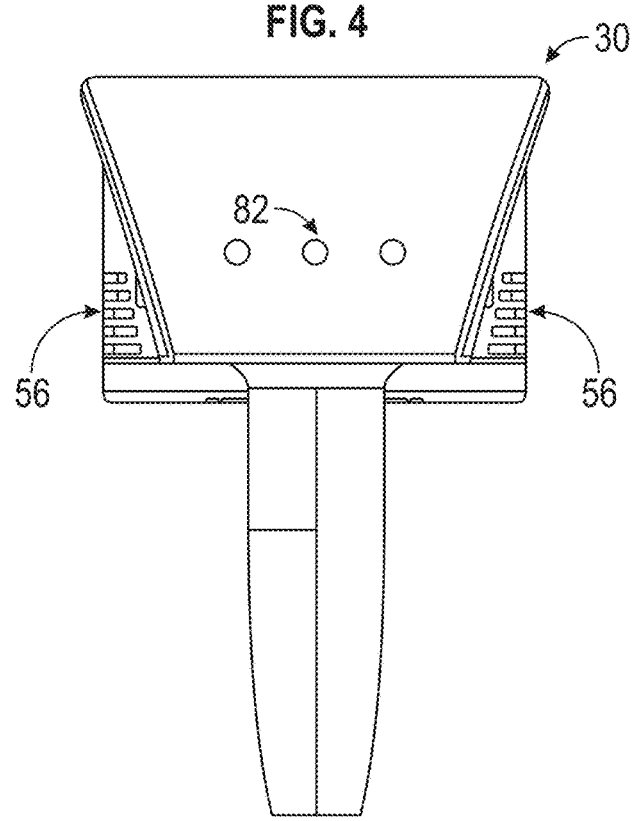
FIG. 5 is a first end view of the system of FIG. 2.
Figure 6:
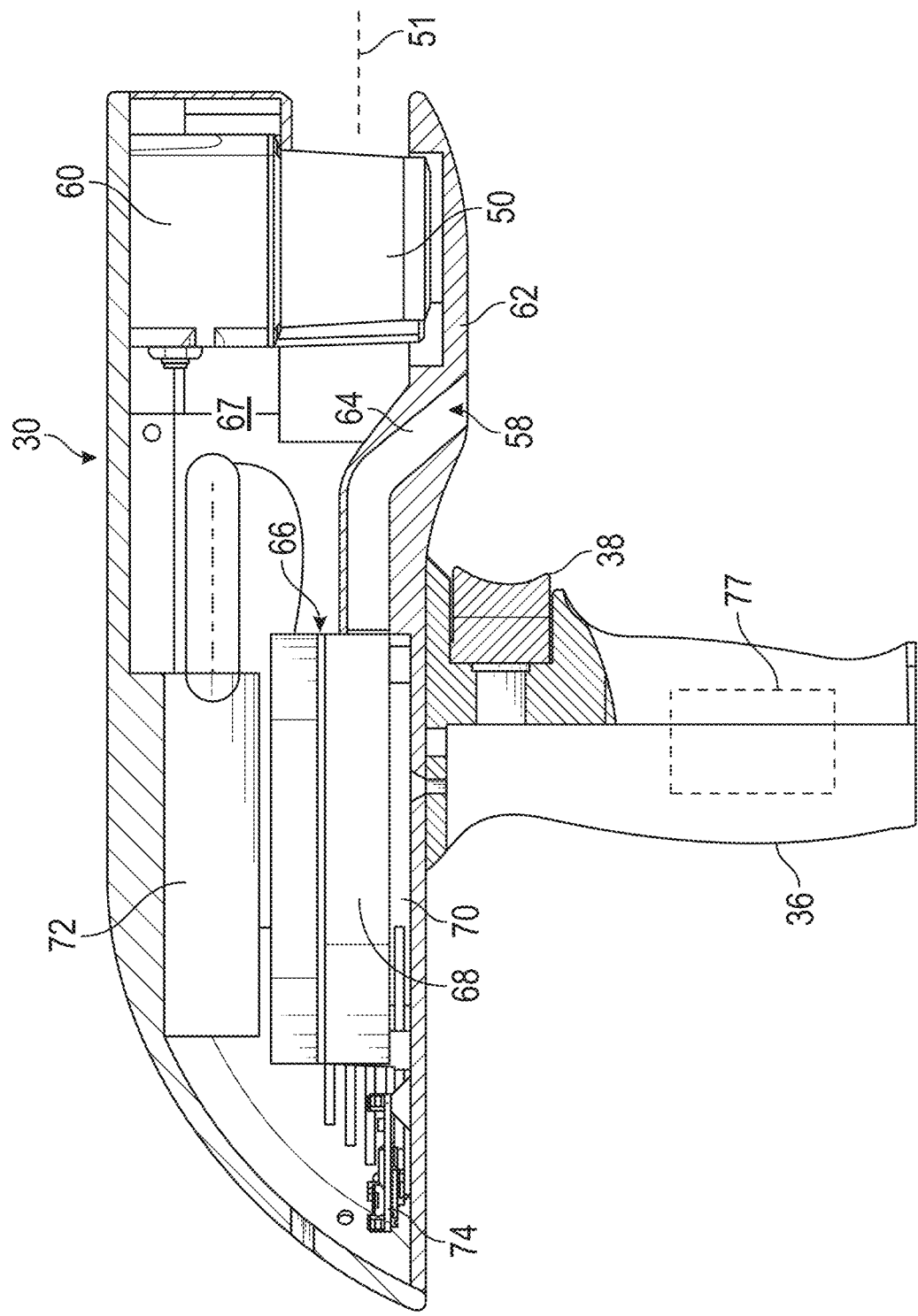
FIG. 6 is a side sectional view of the system of FIG. 2.
Figure 7:
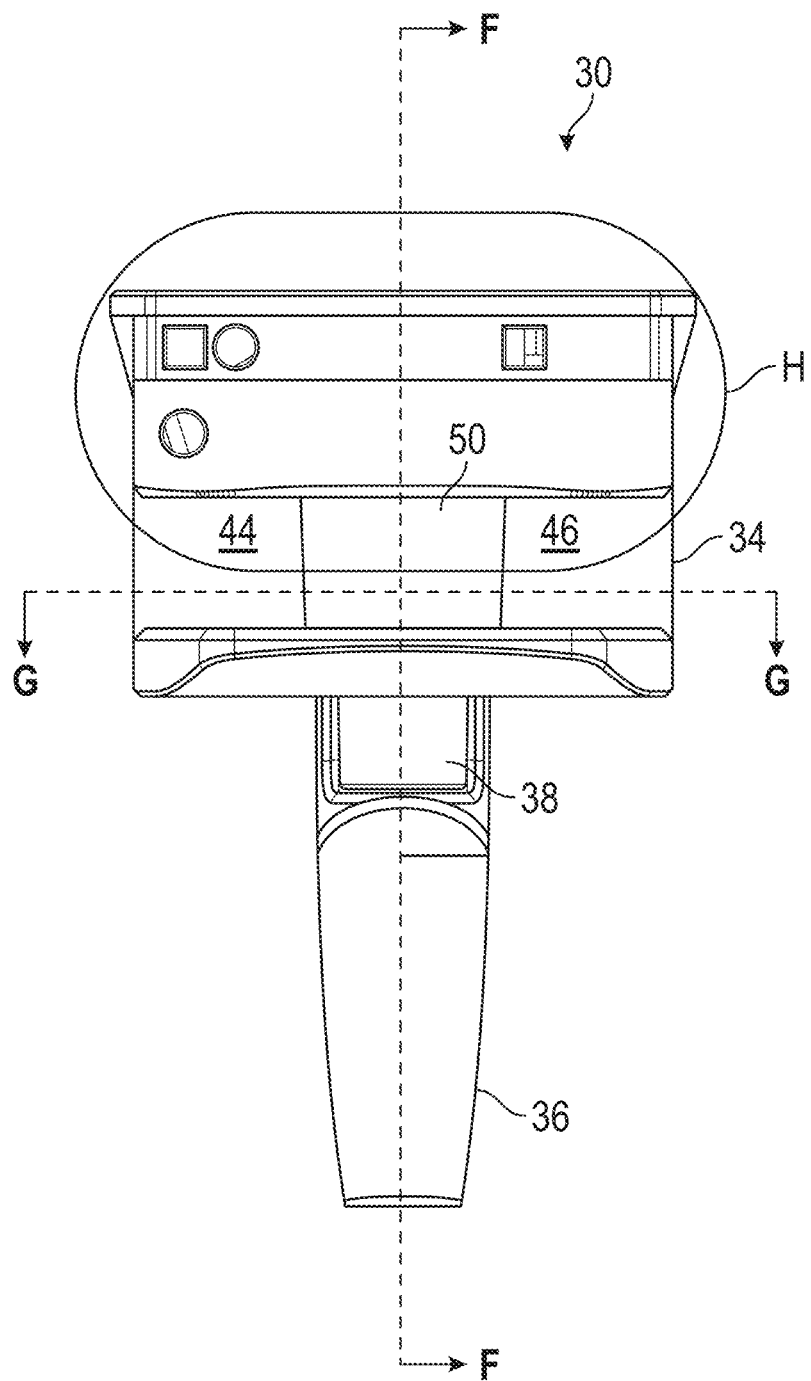
FIG. 7 is a second end view of the system of FIG. 2.
Figure 8:
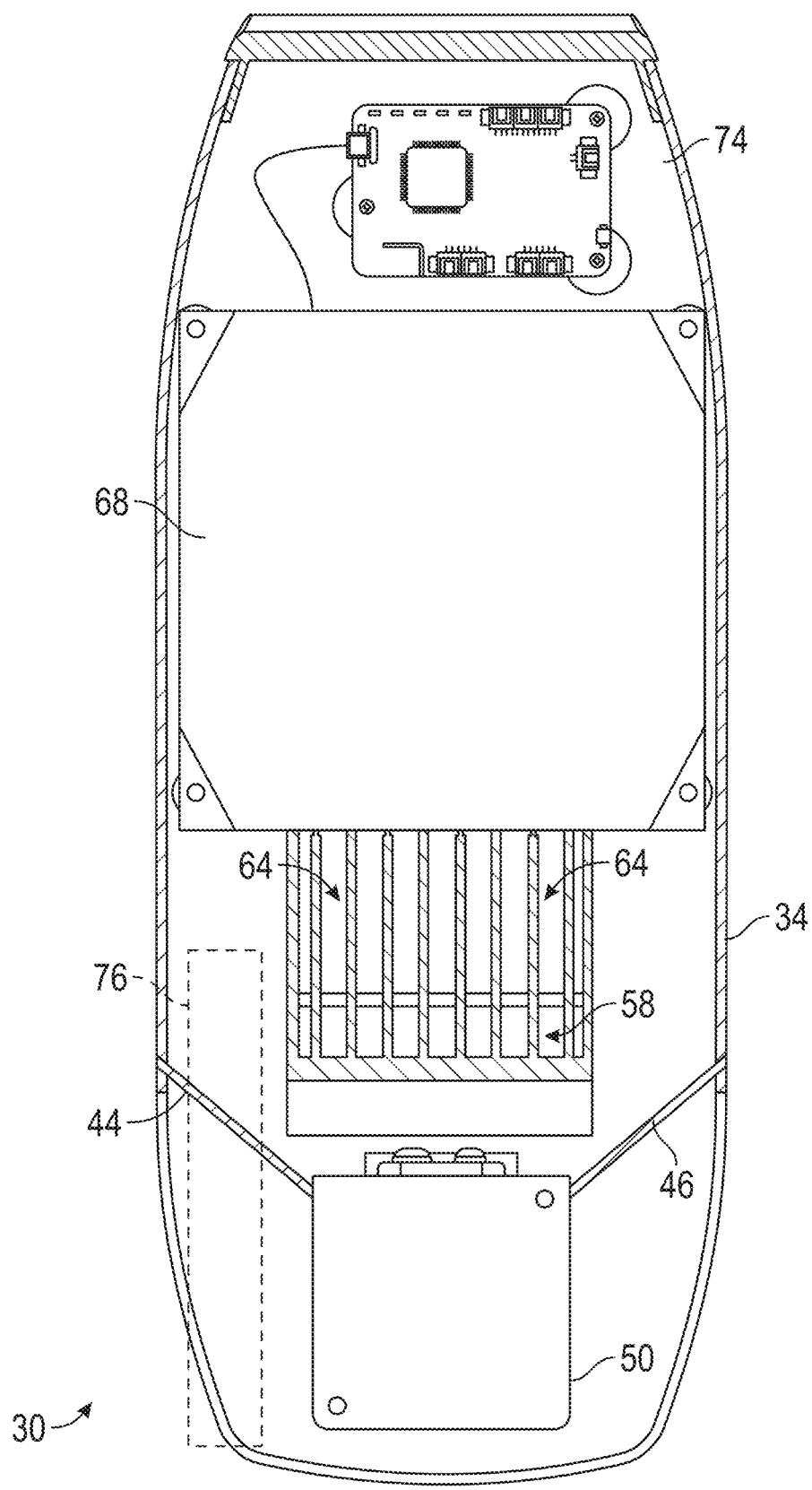
FIG. 8 is a top sectional view of the system of FIG. 2.
Figure 9:
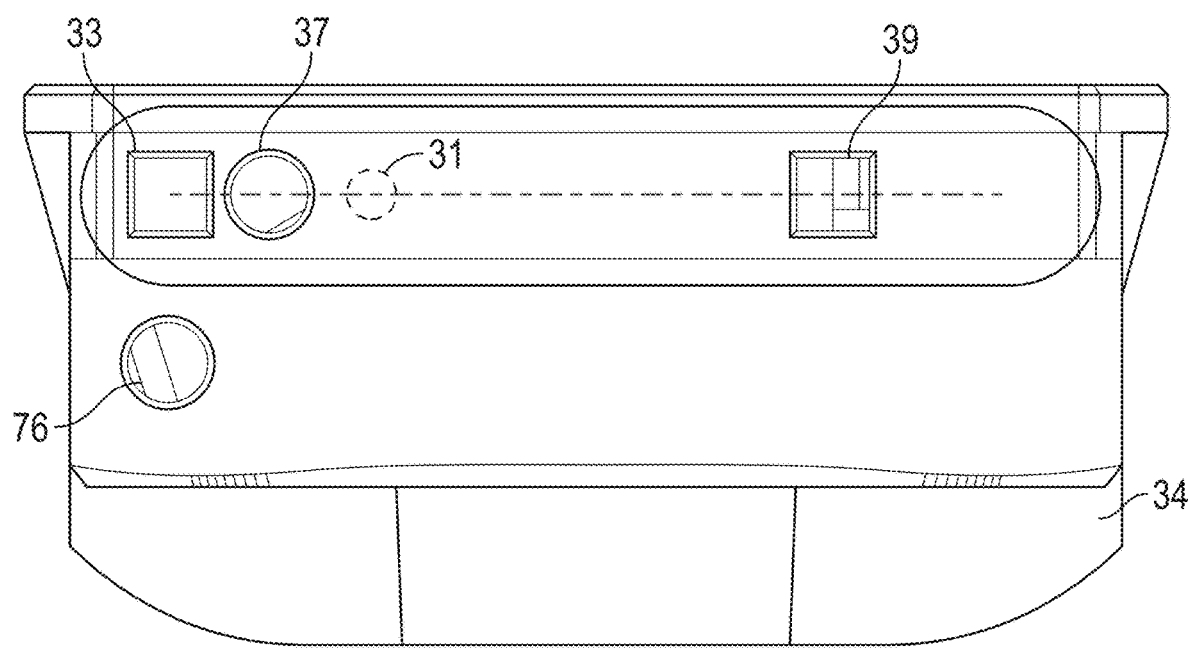
FIG. 9 is an enlarged view of a portion of the second end of FIG. 7.

The detailed description explains embodiments of the invention, together with advantages and features, by way of example with reference to the drawings.

DETAILED DESCRIPTION

The present invention relates to providing a spatio-temporal report of different items in a building based on contents of two-dimensional (2D) maps of the building taken at different points in time, or during different mapping sessions. Examples of items that can be tracked over time include, but are not limited to recognized objects and room labels in 2D maps. As used herein, the term "mapping session" refers to using a scanner(s) to generate a 2D floorplan and adding notes to it at a given time. A new mapping session occurs each time that a user builds a 2D floorplan of the same space/environment. Therefore each mapping session occurs at a different point in time.

Described herein are embodiments of methods to enhance 2D floor maps including the use of object recognition, room segmentation and fusing of data from different devices in order to automatically annotate the floorplan and make the documenting task more efficient. In some situations, the user might need to build periodic floorplans and document the state of a building or other environment over time. This can be a very common requirement in public spaces, in which periodic inspections have to be performed and the presence and/or state of certain objects must be documented (e.g., the presence of fire extinguishers, the presence of signage for emergency exits, the state of the fire doors, etc.).

One or more embodiments keep track of all the information added in different mapping sessions, including the 2D map itself. Tracked items are identified in each mapping session by taking into account the coordinates and the type of each item being tracked. Each time that a new mapping session is initiated, the origin of the 2D map will likely be different due to the user starting the mapping at different locations, and the relation between maps from different mapping sessions is determined prior to comparing the tracked items. In one or more embodiments, the coordinates of the 2D maps are aligned using known techniques such as Monte Carlo methods and/or least square methods. Once the relation between consecutive mapping sessions is known it is possible to identify the same type of objects in roughly the same locations (e.g., using an object recognition method) and a database of tracked items and their state over time (presence, damaged, etc.) can be populated. The 2D maps at different points in time along with the database of tracked items can be used to create fourth-dimensional (4D) data and to track the advancement (e.g., of construction work) over time. It also can allow a review of a status at a previous point in time, for example to identify possible causes of construction faults.

Using an embodiment, a building can be mapped on a daily (or other periodic or aperiodic) basis during a construction process. For example, to document the construction process of a certain wall, the wall can be documented every day with a picture. The complete data including scans of the wall from each data can be saved as time line of data. During the daily data acquisition, the mounting process of pipes in the wall can also be documented. This allows the user to check the exact placements of the pipes later, after the wall is already completely poured-in-place.

The present invention relates to a device that includes a system having a coordinate measurement scanner that works cooperatively with an inertial measurement unit and an image or vision based sensor to generate a 2D map of an environment. As used herein, the term "2D map" refers to a representation of the environment measured by a scanner. The 2D map can be represented internally as a grid map that includes a 2D arranged collection of cells, representing an area of the environment. The grid map stores, for every cell, a probability indicating whether the cell area is occupied or not.

An embodiment of the present invention provides a framework for automatically segmenting rooms and areas of interest in 2D maps using locations of items such as doors and windows that are identified by applying artificial intelligence image recognition techniques to images captured by a vision based sensor. In addition, items such as room labels (e.g., "kitchen", "living room", "office", etc.) can be automatically placed on a 2D map using the image recognition techniques described herein. Embodiments of the present invention can be used for 2D floor planning, location-based documentation, automatic 2D floorplan labeling, and/or computer aided design (CAD) export. The ability to provide automatic segmentation and annotation of 2D maps can expedite the process of documenting buildings, crime scenes, and other locations.

It should be appreciated that while embodiments herein describe the 2D map generation as being based on measurements by a 2D scanner, this is for exemplary purposes and the claims should not be so limited. In other embodiments, the 2D maps may be generated by data acquired by three-dimensional (3D) coordinate measurement devices, such as but not limited to a laser scanner, a laser tracker, a laser line probe, an image scanner or a triangulation scanner for example.

For example, as shown in FIG. 1, a scan is performed and used to generate an unsegmented and unlabeled 2D map 22 of a space inside of a building. Applying one or more contemporary segmentation techniques (e.g., morphological segmentation, Voronoi segmentation, and distance-based segmentation) results in 2D map 23 with segments 25 and 27. The size and boundaries of segments 25 and 27 in 2D map 23 do not accurately reflect the actual rooms of the space that was scanned due, for example, to on an open door between space 25 and 27 when the scan was taken.

Technical solutions provided by embodiments of the present invention provide more accurate segmentation of a scanned space by providing context to 2D maps prior to applying segmentation techniques. 2D map 24 in FIG. 1 is generated by adding context, such as locations of doors and windows, to 2D map 22 prior to applying a segmentation technique. In an embodiment, objects such as doors and windows in the scanned space are identified by applying artificial intelligence image recognition techniques to a video stream generated by a vision based sensor. The identified door 26 is used to segment the space into a kitchen and a hallway. In addition, as shown in 2D map 24, scan data in 2D map 22 of locations outside of the identified window 28 are removed. In an embodiment, image recognition techniques are also used to identify objects in the image stream such, but not limited to: sinks, dishwashers, beds, and showers. The identified objects shown in FIG. 1 include stove 21 and fire extinguisher 29 which are used along with other identified objects to automatically label the segmented areas. As shown in 2D map 24, the areas are labeled "kitchen" and "hallway." The segmenting and labeling described herein are performed automatically and without user intervention.

Referring now to FIGS. 2-9, an embodiment of a system 30 having a housing 32 that includes a body portion 34 and a handle portion 36. The handle 36 may include an actuator 38 that allows the operator to interact with the system 30. In the exemplary embodiment, the body 34 includes a generally rectangular center portion 35 with a slot 40 formed in an end 42. The slot 40 is at least partially defined by a pair of walls 44, 46 that are angled towards a second end 48. As will be discussed in more detail herein, a portion of a 2D scanner 50 is arranged between the walls 44, 46. The walls 44, 46 are angled to allow the scanner 50 to operate by emitting a light over a large angular area without interference from the walls 44, 46. As will be discussed in more detail herein, the end 42 may further include a three-dimensional camera or RGBD camera 60.

In the exemplary embodiment, the second end 48 is defined by a semi-cylindrical surface 52 and a pair of side walls 54. In an embodiment, the side walls 54 include a plurality of exhaust vent openings 56. The exhaust vent openings 56 are fluidly coupled to intake vent openings 58 arranged on a bottom surface 62 of center portion 35. The intake vent openings 58 allow external air to enter a conduit 64 having an opposite opening 66 (FIG. 6) in fluid communication with the hollow interior 67 of the body 34. In an embodiment, the opening 66 is arranged adjacent to a controller 68 which has one or more processors that is operable to perform the methods described herein. In an embodiment, the external air flows from the opening 66 over or around the controller 68 and out the exhaust vent openings 56.

The controller 68 is coupled to a wall 70 of body 34. In an embodiment, the wall 70 is coupled to or integral with the handle 36. The controller 68 is electrically coupled to the 2D scanner 50, the 3D camera 60, and a power source 72, an inertial measurement unit (IMU) 74, a laser line projector 76, and a haptic feedback device 77.

Figure 10:
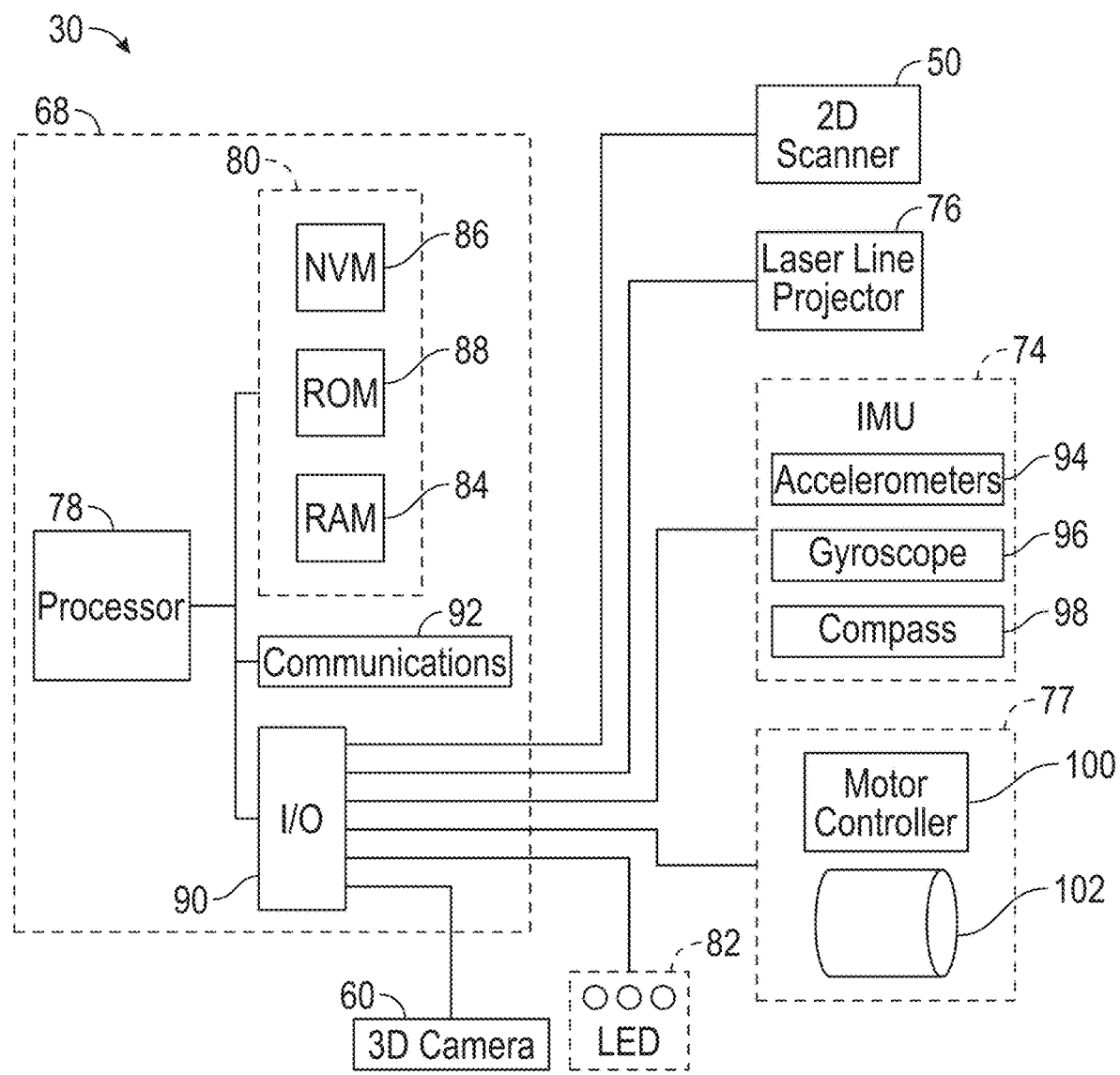
FIG. 10 is a schematic illustration of the system of a scanning and mapping system in accordance with an embodiment.

Referring now to FIG. 10 with continuing reference to FIGS. 2-9, elements are shown of the system 30. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 is capable of converting the analog voltage or current level provided by 2D scanner 50, 3D camera 60 and IMU 74 into a digital signal to determine a distance from the system 30 to an object in the environment. Controller 68 uses the digital signals that act as input to various processes for controlling the system 30. The digital signals represent one or more system 30 data including but not limited to distance to an object, images of the environment, acceleration, pitch orientation, yaw orientation and roll orientation.

In general, controller 68 accepts data from 2D scanner 50 and IMU 74 and is given certain instructions for the purpose of generating a 2D map of a scanned environment. Controller 68 provides operating signals to the 2D scanner 50, the 3D camera 60, laser line projector 76 and haptic feedback device 77. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user interface coupled to controller 68. The user interface may be one or more LEDs (light-emitting diodes) 82, an LCD (liquid-crystal diode) display, a CRT (cathode ray tube) display, or the like. A keypad may also be coupled to the user interface for providing data input to controller 68. In one embodiment, the user interface is arranged or executed on a mobile computing device that is coupled for communication, such as via a wired or wireless communications medium (e.g. Ethernet, serial, USB, Bluetooth™ or WiFi) for example, to the system 30.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet(ˆ) Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 78 are coupled to memory 80. The memory 80 may include random access memory (RAM)

device 84, a non-volatile memory (NVM) device 86, and a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Controller 68 includes operation control methods embodied in application code (illustrated by one or more flowcharts herein). These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C #, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 68 is the 2D scanner 50. The 2D scanner 50 measures 2D coordinates in a plane. In the exemplary embodiment, the scanning is performed by steering light within a plane to illuminate object points in the environment. The 2D scanner 50 collects the reflected (scattered) light from the object points to determine 2D coordinates of the object points in the 2D plane. In an embodiment, the 2D scanner 50 scans a spot of light over an angle while at the same time measuring an angle value and corresponding distance value to each of the illuminated object points.

Examples of 2D scanners 50 include, but are not limited to Model LMS100 scanners manufactured by Sick, Inc. of Minneapolis, Minn. and scanner Models URG-04LX-UG01 and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D scanner 50 is oriented so as to scan a beam of light over a range of angles in a generally horizontal plane (relative to the floor of the environment being scanned). At instants in time the 2D scanner 50 returns an angle reading and a corresponding distance reading to provide 2D coordinates of object points in the horizontal plane. In completing one scan over the full range of angles, the 2D scanner returns a collection of paired angle and distance readings. As the system 30 is moved from place to place, the 2D scanner 50 continues to return 2D coordinate values. These 2D coordinate values are used to locate the position of the system 30 thereby enabling the generation of a two-dimensional map or floorplan of the environment.

Also coupled to the controller 86 is the IMU 74. The IMU 74 is a position/orientation sensor that may include accelerometers 94 (inclinometers), gyroscopes 96, a magnetometers or compass 98, and altimeters. In the exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

In embodiment, the system 30 further includes a 3D camera 60. As used herein, the term 3D camera refers to a device that produces a two-dimensional image that includes distances to a point in the environment from the location of system 30. The 3D camera 30 may be a range camera or a stereo camera. In an embodiment, the 3D camera 30 includes an RGB-D sensor that combines color information with a per-pixel depth information. In an embodiment, the 3D camera 30 may include an infrared laser projector 31 (FIG. 9), a left infrared camera 33, a right infrared camera 39, and a color camera 37. In an embodiment, the 3D camera 60 is a RealSense™ camera model R200 manufactured by Intel Corporation.

In the exemplary embodiment, the system 30 is a hand-held portable device that is sized and weighted to be carried by a single person during operation. Therefore, the plane 51 (FIG. 6) in which the 2D scanner 50 projects a light beam may not be horizontal relative to the floor or may continuously change as the computer moves during the scanning process. Thus, the signals generated by the accelerometers 94, gyroscopes 96 and compass 98 may be used to determine the pose (yaw, roll, tilt) of the system 30 and determine the orientation of the plane 51.

In an embodiment, it may be desired to maintain the pose of the system 30 (and thus the plane 51) within predetermined thresholds relative to the yaw, roll and pitch orientations of the system 30. In an embodiment, a haptic feedback device 77 is disposed within the housing 32, such as in the handle 36. The haptic feedback device 77 is a device that creates a force, vibration or motion that is felt or heard by the operator. The haptic feedback device 77 may be, but is not limited to: an eccentric rotating mass vibration motor or a linear resonant actuator for example. The haptic feedback device is used to alert the operator that the orientation of the light beam from 2D scanner 50 is equal to or beyond a predetermined threshold. In operation, when the IMU 74 measures an angle (yaw, roll, pitch or a combination thereof), the controller 68 transmits a signal to a motor controller 100 that activates a vibration motor 102. Since the vibration originates in the handle 36, the operator will be notified of the deviation in the orientation of the system 30. The vibration continues until the system 30 is oriented within the predetermined threshold or the operator releases the actuator 38. In an embodiment, it is desired for the plane 51 to be within 10-15 degrees of horizontal (relative to the ground) about the yaw, roll and pitch axes.

Figure 11:
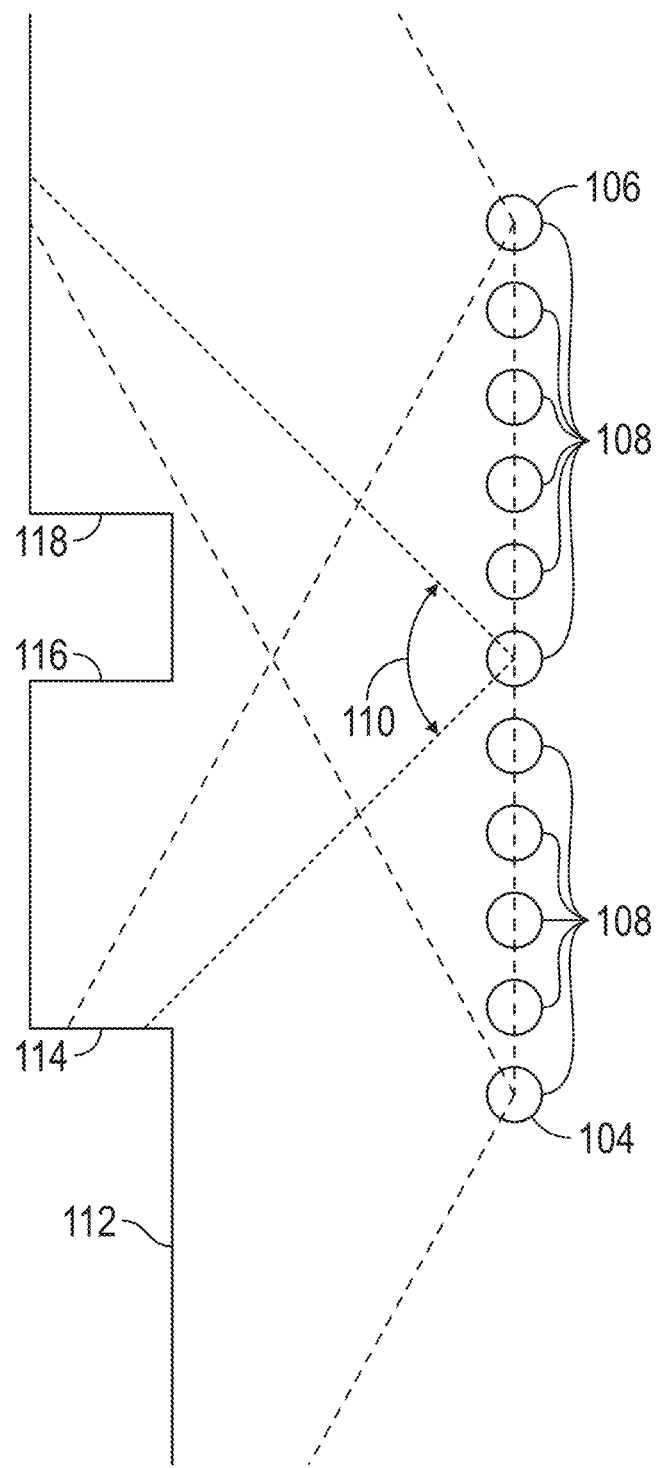
FIGS. 11-13 are plan views of stages of a 2D map generated in accordance with an embodiment.

In an embodiment, the 2D scanner 50 makes measurements as the system 30 is moved about an environment, such as from a first position 104 to a second registration position 106 as shown in FIG. 11. In an embodiment, 2D scan data is collected and processed as the system 30 passes through a plurality of 2D measuring positions 108. At each measuring position 108, the 2D scanner 50 collects 2D coordinate data over an effective FOV 110. Using methods described in more detail below, the controller 86 uses 2D scan data from the plurality of 2D scans at positions 108 to determine a position and orientation of the system 30 as it is moved about the environment. In an embodiment, the common coordinate system is represented by 2D Cartesian coordinates x, y and by an angle of rotation θ relative to the x or y axis. In an embodiment, the x and y axes lie in the plane of the 2D scanner and may be further based on a direction of a "front" of the 2D scanner 50.

Figure 12:
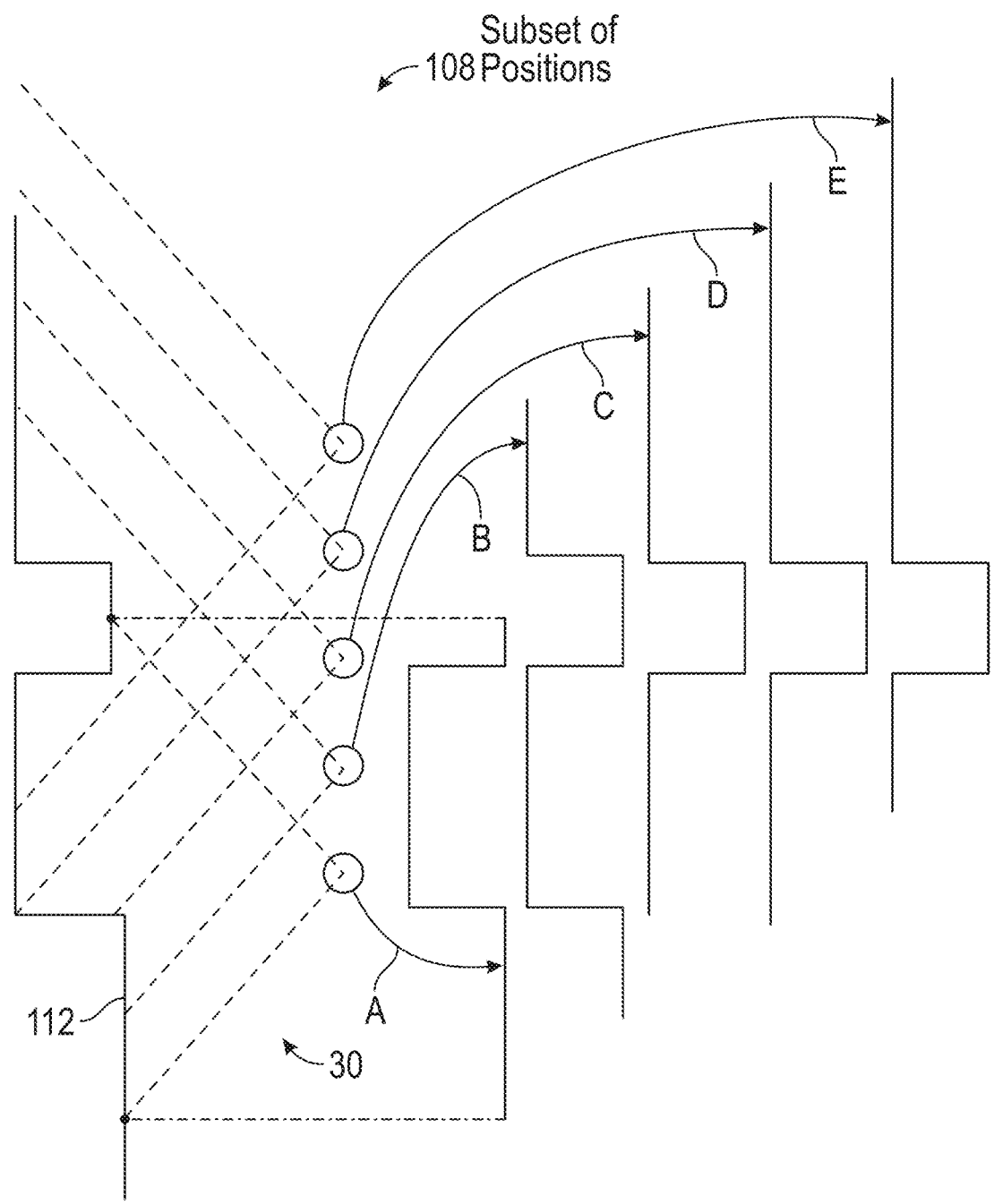

FIG. 12 shows the 2D system 30 collecting 2D scan data at selected positions 108 over an effective FOV 110. At different positions 108, the 2D scanner 50 captures a portion of the object 112 marked A, B, C, D, and E. FIG. 12 shows 2D scanner 50 moving in time relative to a fixed frame of reference of the object 112.

Figure 13:
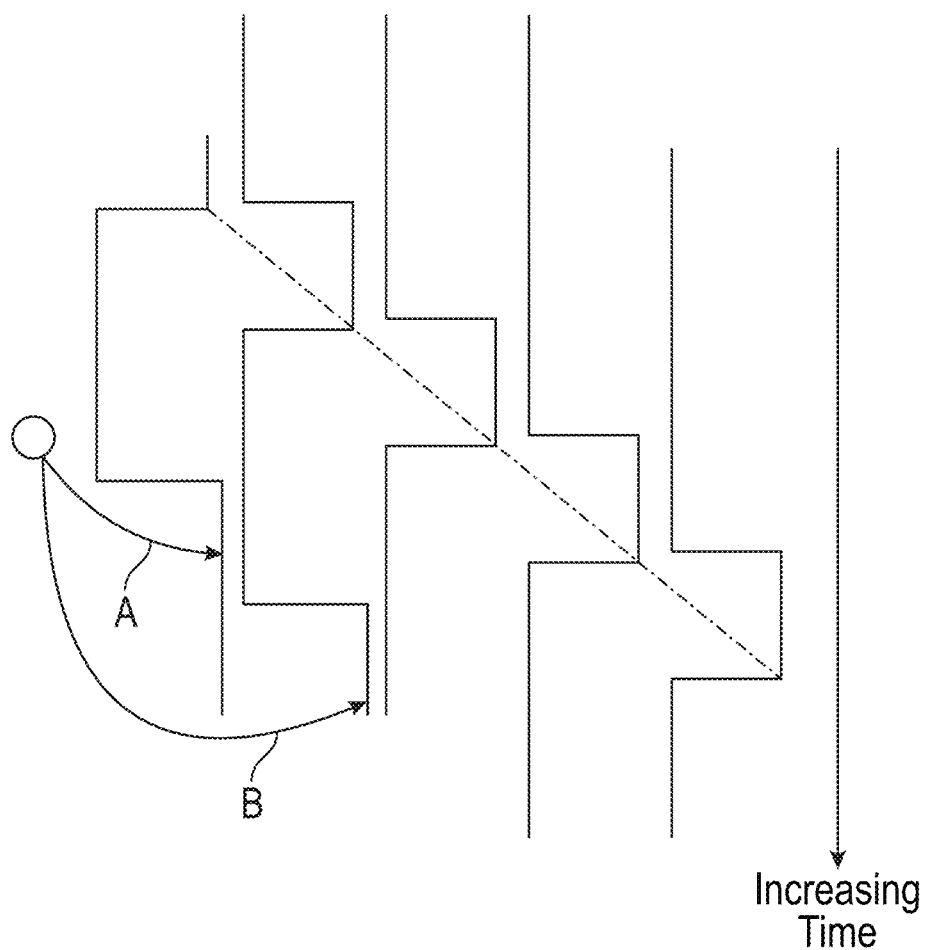

FIG. 13 includes the same information as FIG. 12 but shows it from the frame of reference of the system 30 rather than the frame of reference of the object 112. FIG. 13 illustrates that in the system 30 frame of reference, the position of features on the object change over time. Therefore, the distance traveled by the system 30 can be determined from the 2D scan data sent from the 2D scanner 50 to the controller 86.

As the 2D scanner 50 takes successive 2D readings and performs best-fit calculations, the controller 86 keeps track of the translation and rotation of the 2D scanner 50, which is the same as the translation and rotation of the system 30. In this way, the controller 86 is able to accurately determine the change in the values of x, y, θ as the system 30 moves from the first position 104 to the second position 106.

In an embodiment, the controller 86 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 114, 116, and 118 shown in FIG. 11. The mathematical criterion may involve processing of the raw data provided by the 2D scanner 50 to the controller 86, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane 51 of the light beam from 2D scanner 50 remains horizontal relative to the ground plane, the first translation value is dx, the second translation value is dy, and the first rotation value de. If the first scan data is collected with the 2D scanner 50 having translational and rotational coordinates (in a reference coordinate system) of $(x_1, y_1, \theta_1)$, then when the second 2D scan data is collected at a second location the coordinates are given by $(x_2, y_2, \theta_2)=(x_1+dx, y_1+dy, \theta_1+d\theta)$. In an embodiment, the controller 86 is further configured to determine a third translation value (for example, dz) and a second and third rotation values (for example, pitch and roll). The third translation value, second rotation value, and third rotation value may be determined based at least in part on readings from the IMU 74.

The 2D scanner 50 collects 2D scan data starting at the first position 104 and more 2D scan data at the second position 106. In some cases, these scans may suffice to determine the position and orientation of the system 30 at the second position 106 relative to the first position 104. In other cases, the two sets of 2D scan data are not sufficient to enable the controller 86 to accurately determine the first translation value, the second translation value, and the first rotation value. This problem may be avoided by collecting 2D scan data at intermediate scan positions 108. In an embodiment, the 2D scan data is collected and processed at regular intervals, for example, once per second. In this way, features in the environment are identified in successive 2D scans at positions 108. In an embodiment, when more than two 2D scans are obtained, the controller 86 may use the information from all the successive 2D scans in determining the translation and rotation values in moving from the first position 104 to the second position 106. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the system 30 is moved beyond the second position 106, a two-dimensional image or map of the environment being scanned may be generated.

Figure 14:
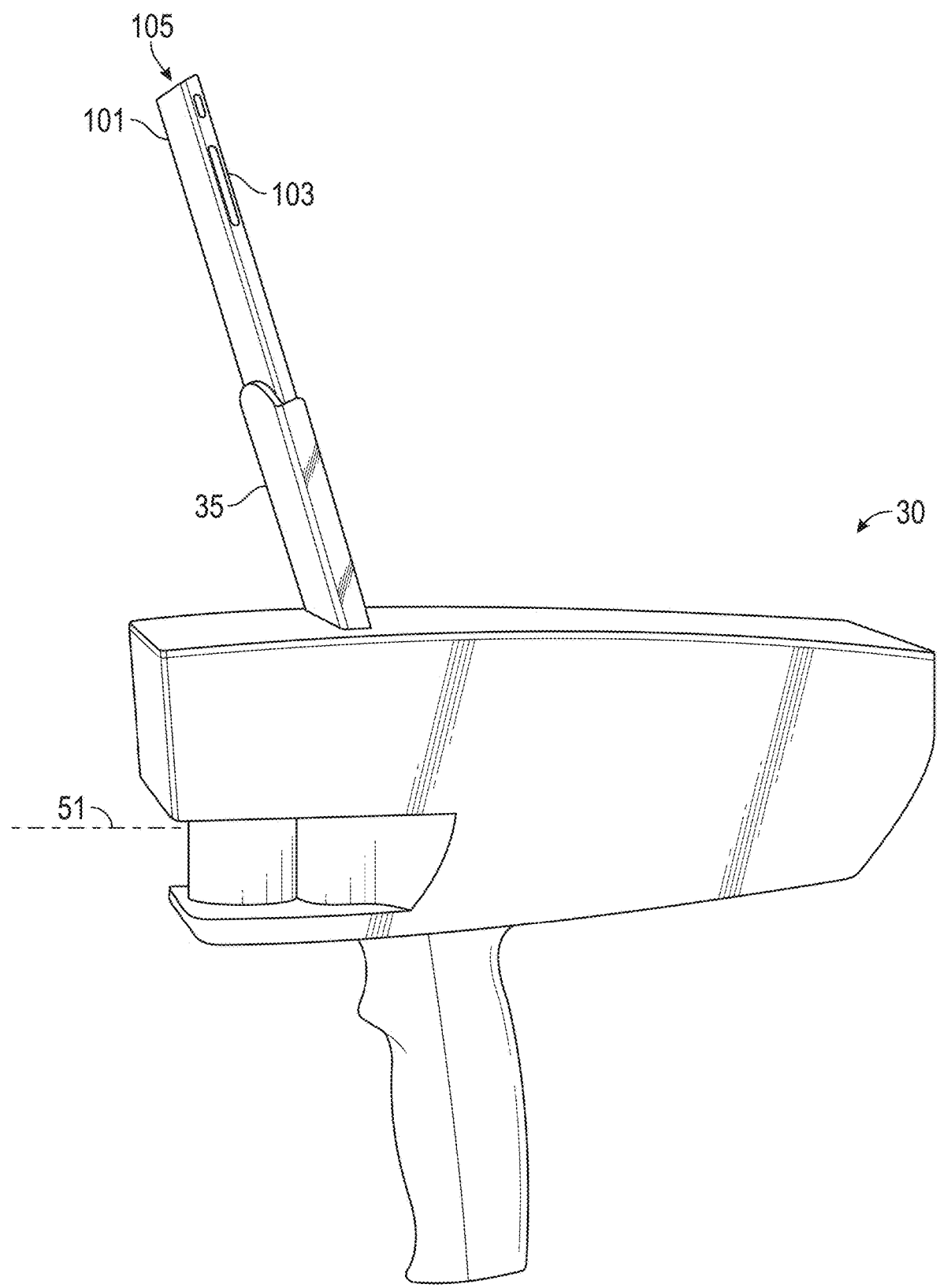
FIG. 14 depicts a scanning and mapping system in accordance with an embodiment.

FIG. 14 depicts the system 30 coupled with an image capture device for generating a 2D map of the environment according to one or more embodiments. In one or more examples, the image capture device 105 is a portable computing device such as a mobile phone, a tablet computer, a camera, a media device, or any other such electronic device. The image capture device 105 includes a camera 101 for capturing one or more images, which may be captured in a continuous, periodic or aperiodic manner. As used herein, the "continuous" capture of images refers to the acquisition of images at a predetermined or desired frame rate, such as 60 frames per second (fps) or 30 fps for example. In one embodiment, the frame rate may be user selectable. Further, the image capture device 105 includes a display device 103, such as a screen. Elements displayed on the display device 103 may be interacted with by the operator, for example via a touch screen, or any other input device. The image capture device 105 includes other components such as one or more processors, sensors, I/O devices, communications circuits (e.g. cellular, Ethernet, WiFi, BLUETOOTH™ and near-field) and the like, which are not shown.

The image capture device 105 is coupled with the system 30 using a mounting support 35. The mounting support 35 facilitates the image capture device 105 to be mounted in a stable position relative to the laser projector 31 in the system 30. In one or more examples, the relative position of the image capture device 105 and the system 30 is fixed and predetermined. In an embodiment, the position of the image capture device includes a linear spatial relationship (X, Y, Z) and the rotational or angular spatial relationship to the 2D scanner. The linear and angular relationship may also be referred to as the "pose" of the image capture device 105 to the 2D scanner. In one embodiment, the angular relationship of the image capture device 105 includes a predetermined angle relative to the plane 51.

The 2D scanner 50 continuously creates a 2D map of its environment as described herein using the incoming data from the laser range finder 31 and the IMU. The system 30 further facilitates the image capture device 105 to use its display 103 to visualize and interact with the 2D scanner 50. In one or more examples, the image capture device 105 and the 2D scanner communicate with each other via cable or wirelessly (e.g. BLUETOOTH™, WLAN™, etc.).

By having the image capture device 105 mounted in a stable position relative to the laser range finder 31 in the 2D scanner 50, the 2D laser data from the 2D scanner is calibrated (FIGS. 15 and 16) with the position sensors on the image capture device 105, enabling the merging or fusion of the data coming from both, the 2D scanner 50 and the image capture device 105.

Figure 15:
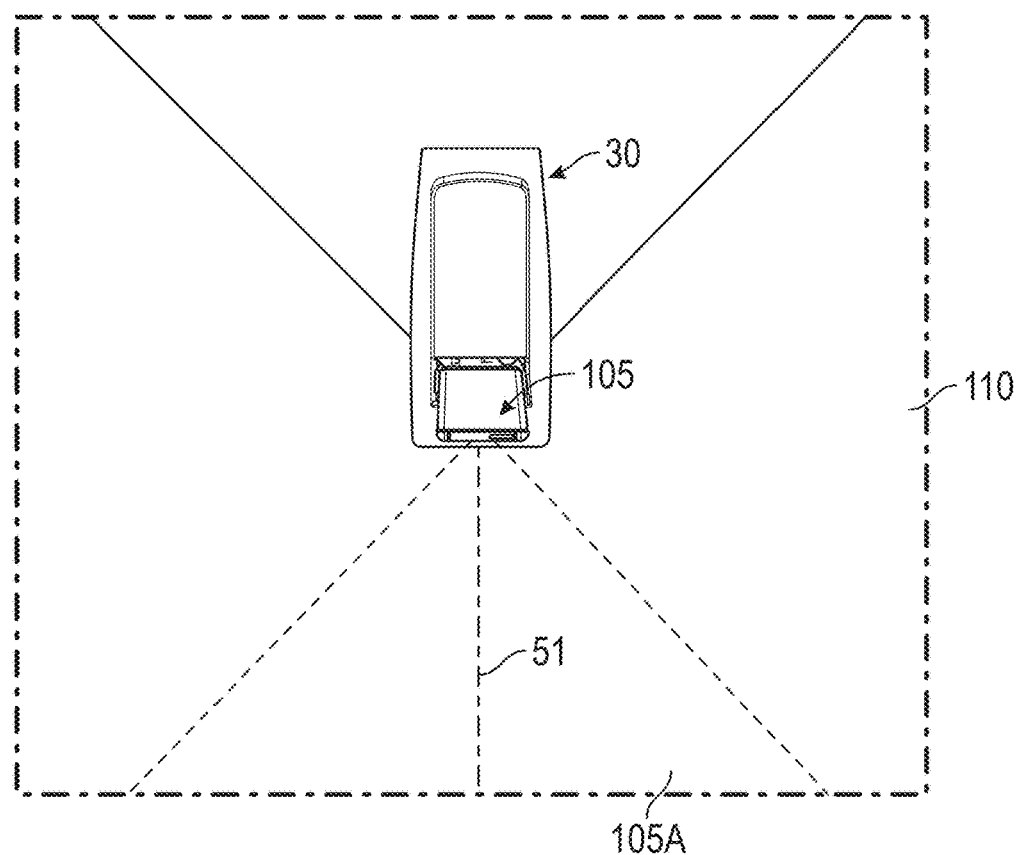
FIG. 15-16 depict field of views of an image capture system and a point scanner in accordance with an embodiment.
Figure 16:
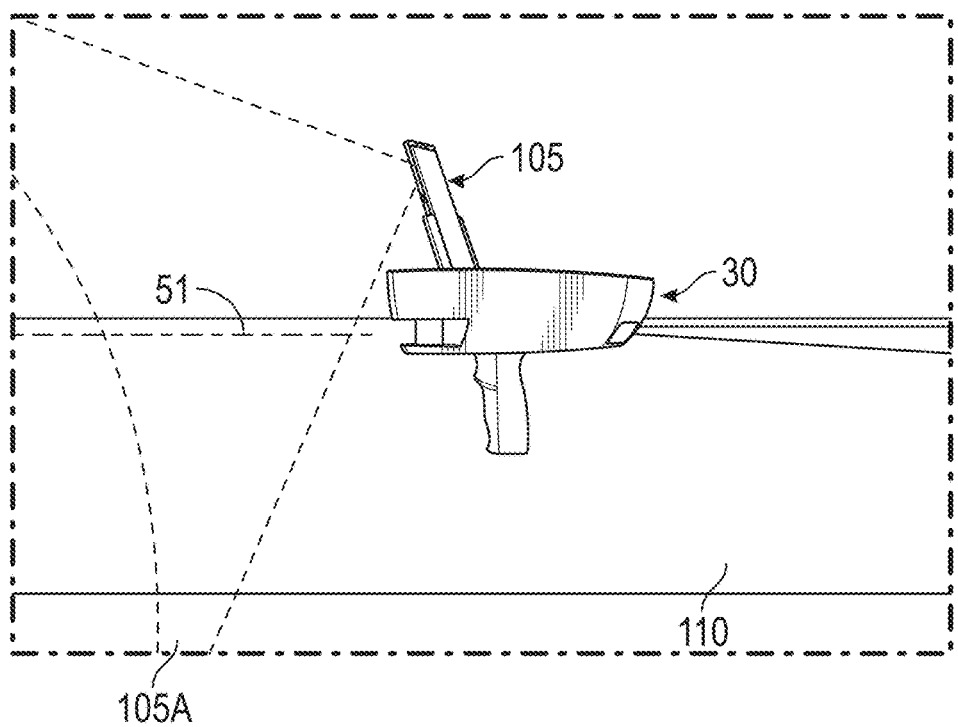

FIG. 15 and FIG. 16 depict overlapping FOVs of the 2D scanner and image capture device of the system according to one or more embodiments. The FOV 110 of the 2D scanner 50 overlaps with a FOV 105A of the image capture device 105. FIG. 15 depicts a top-view while FIG. 16 depicts a side-view of an example scenario with the overlapping FOVs 110 and 105A. Based on the relative position of the two devices, the system 30 calculates the coordinates of the laser readings from the laser projector 31 in the camera 101 coordinate system and vice versa. This calculation may be referred to as calibrating the image capture device 105 and the 2D scanner 50. The calibration is based on the relative position of the image capture device 105 and the scanner 50, including the angle at which the image capture device 105 is mounted with the scanner 50. The angle may be predetermined based on the mounting port provided by the scanner 50. Using the calibrated pair of devices, the system 30 facilitates the operator to interact with fused data generated from the data captured by each device, the 2D scanner 50 and the image capture device 105, independently. For example, the system can provide interactivity to the operator via the display 103 to facilitate the operator to interact with the point clouds captured by the 2D scanner 50 via a live stream of the visual capture from the image capture device 105. In one or more examples, the interactivity includes the operator augmenting the 2D map, for example with notes, images, and the like. Alternatively, or in addition, the interactivity may include identifying one or more shapes/objects in the 2D map by marking one or more boundaries within the stream captured by the image capture device 105. Further, the interactivity can include taking measurements of the one or more shapes/objects identified in the 2D map.

Figure 17:
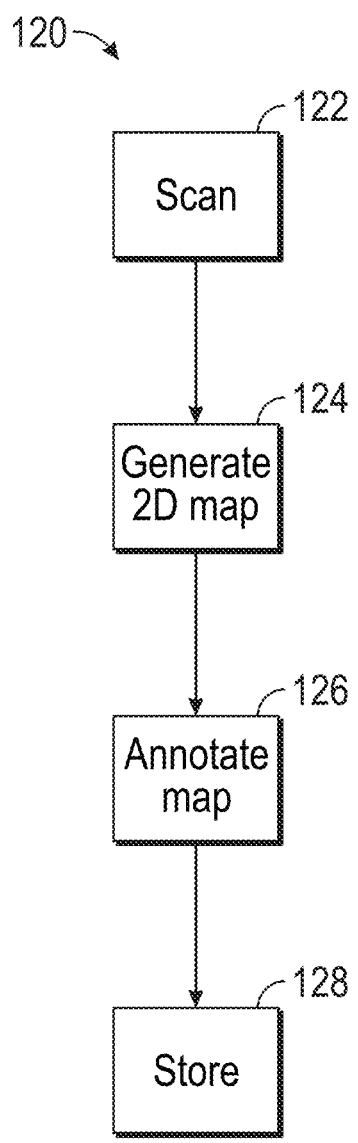
FIG. 17 is a flow diagram of a method of generating a 2D map with annotations in accordance with an embodiment.
Figure 18:
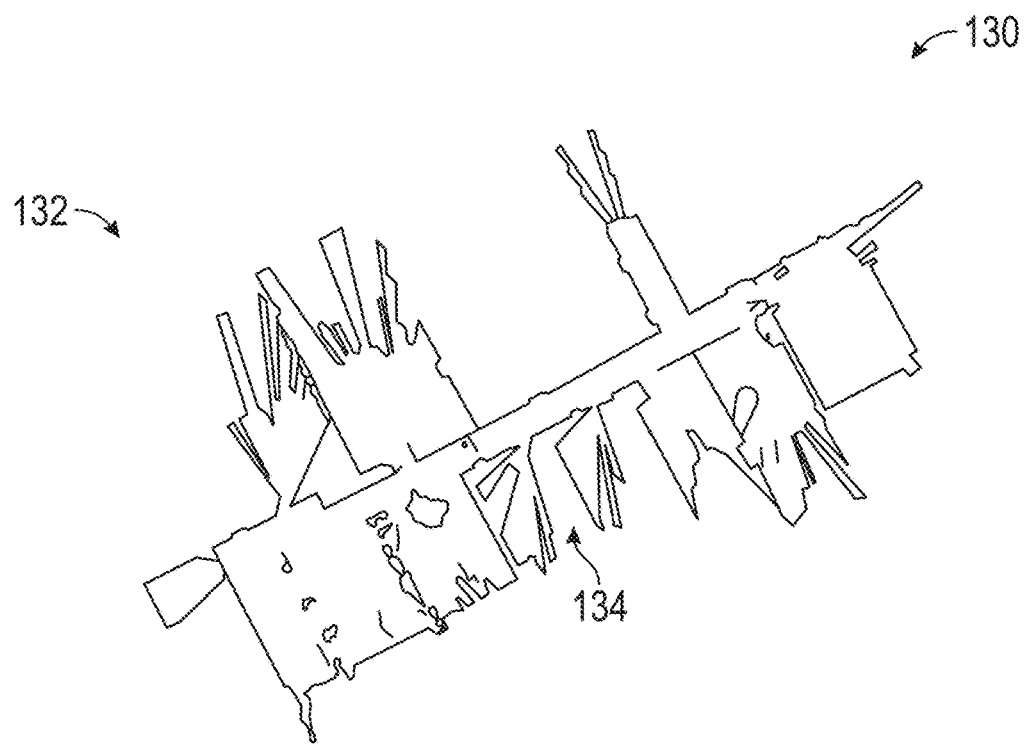
FIG. 18-21 are plan views of stages of a 2D map generated with the method of FIG. 10 in accordance with an embodiment.

Referring now to FIG. 17, a method 120 is shown for generating a two-dimensional map with annotations. The method 120 starts in block 122 where the facility or area is scanned to acquire scan data 130, such as that shown in FIG. 18. The scanning is performed by carrying the system 30 through the area to be scanned. The system 30 measures distances from the system 30 to an object, such as a wall for example, and also a pose of the system 30 in an embodiment the user interacts with the system 30 via actuator 38. In other embodiments, a mobile computing device (e.g. cellular phone) provides a user interface that allows the operator to initiate the functions and control methods described herein. Using the registration process desired herein, the two dimensional locations of the measured points on the scanned objects (e.g. walls, doors, windows, cubicles, file cabinets etc.) may be determined. It is noted that the initial scan data may include artifacts, such as data that extends through a window 132 or an open door 134 for example. Therefore, the scan data 130 may include additional information that is not desired in a 2D map or layout of the scanned area.

Figure 19:
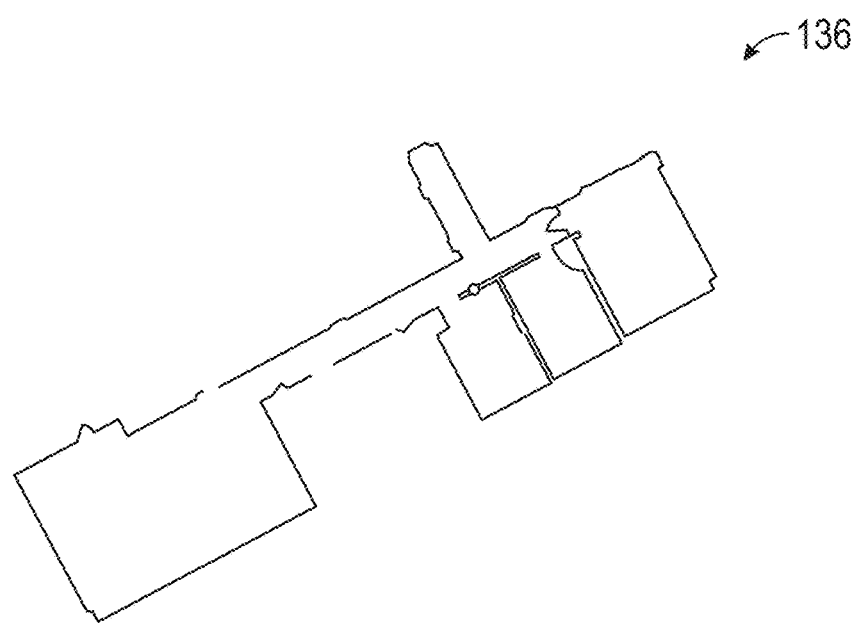
Figure 20:
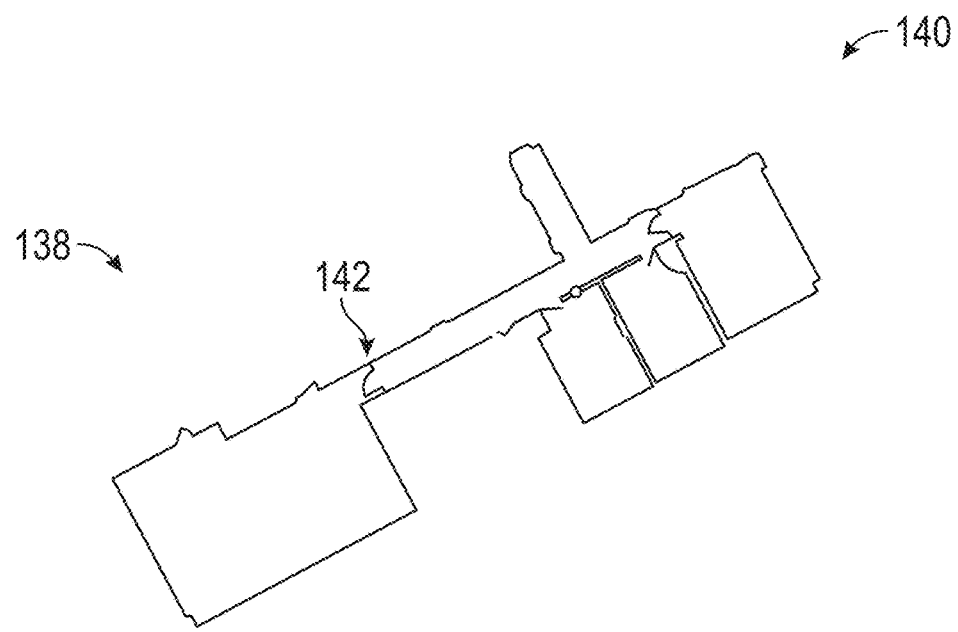
Figure 21:
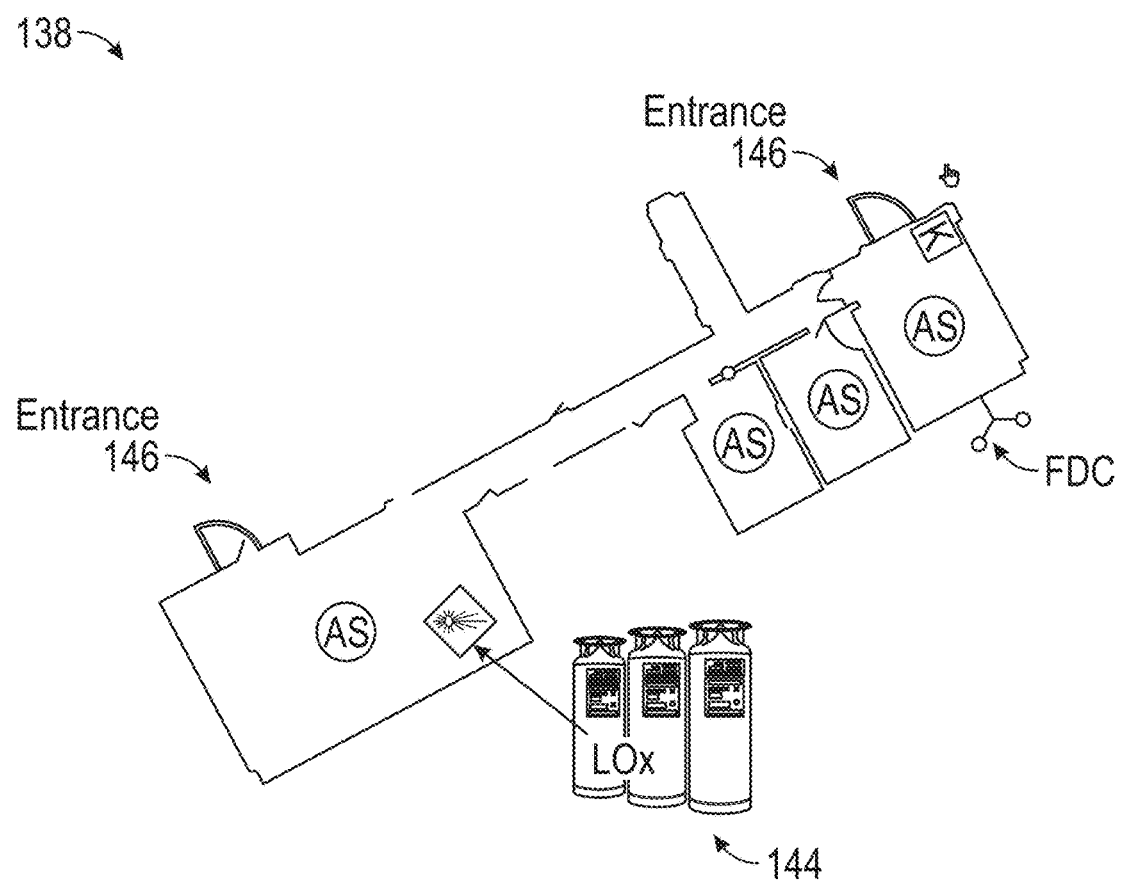

The method 120 then proceeds to block 124 where a 2D map 136 is generated of the scanned area as shown in FIG. 19. The generated 2D map 136 represents a scan of the area, such as in the form of a floor plan without the artifacts of the initial scan data. It should be appreciated that the 2D map 136 may be utilized directly by an architect, interior designer or construction contractor as it represents a dimensionally accurate representation of the scanned area. In the embodiment of FIG. 17, the method 120 then proceeds to block 126 where user-defined annotations are made to the 2D maps 136 to define an annotated 2D map 138 (FIG. 20 and FIG. 21) that includes information, such as dimensions of features 140, the location of doors 142, the relative positions of objects (e.g. liquid oxygen tanks 144, entrances/exits or egresses 146 or other notable features such as but not limited to the location of automated sprinkler system ("AS"), knox or key boxes ("K"), or fire department connection points ("FDC"). In some geographic regions, public safety services such as fire departments may keep records of building or facility layouts for use in case of an emergency as an aid to the public safety personnel in responding to an event. It should be appreciated that these annotations may be advantageous in alerting the public safety personnel to potential issues they may encounter when entering the facility, and also allow them to quickly locate egress locations.

Once the annotations of the 2D annotated map 138 are completed, the method 120 then proceeds to block 128 where the 2D annotated map 138 is stored in memory, such as nonvolatile memory 80 for example. The 2D annotated map 138 may also be stored in a network accessible storage device or server so that it may be accessed by the desired personnel.

Figure 22:
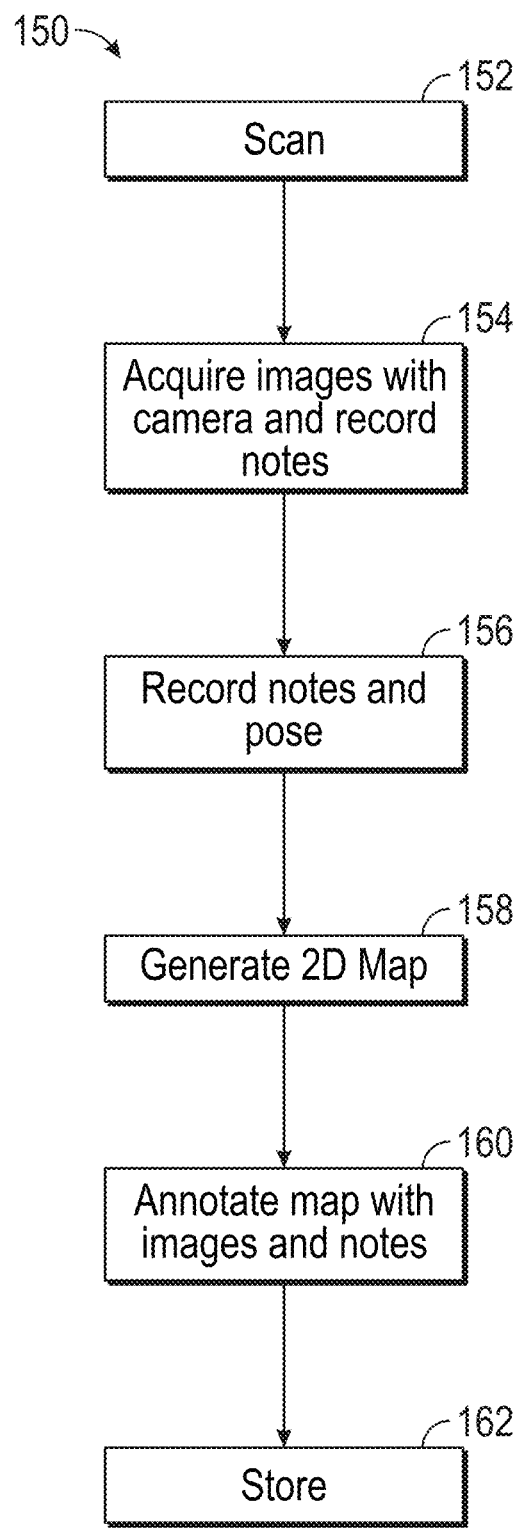
FIG. 22 is a flow diagram of a method of generating a 2D map with annotations in accordance with an embodiment.

Referring now to FIG. 22, another method 150 is shown for generating a 2D map or layout. In this embodiment, the method 150 starts in block 152 with the operator initiating the scanning of an area or facility with the system 30 as described herein. The method 150 then proceeds to block 154 wherein the operator acquires images with a vision based sensor, such as a camera, during the scanning process. The images may be acquired by a camera located in a mobile computing device (e.g. personal digital assistant, cellular phone, tablet or laptop) carried by the operator for example. In an embodiment, the system 30 may include a holder (not shown) that couples the mobile computing device to the system 30. In block 154, the operator may further record notes. These notes may be audio notes or sounds recorded by a microphone in the mobile computing device. These notes may further be textual notes input using a keyboard on the mobile computing device. It should be appreciated that the acquiring of images and recording of notes may be performed simultaneously, such as when the operator acquires a video. In an embodiment, the recording of the images or notes may be performed using a software application executed on a processor of the mobile computing device. The software application may be configured to communicate with the system 30, such as by a wired or wireless (e.g. Bluetooth™) connection for example, to transmit the acquired images or recorded notes to the system 30. In one embodiment, the operator may initiate the image acquisition by actuating actuator 38 that causes the software application to transition to an image acquisition mode.

Figure 23:
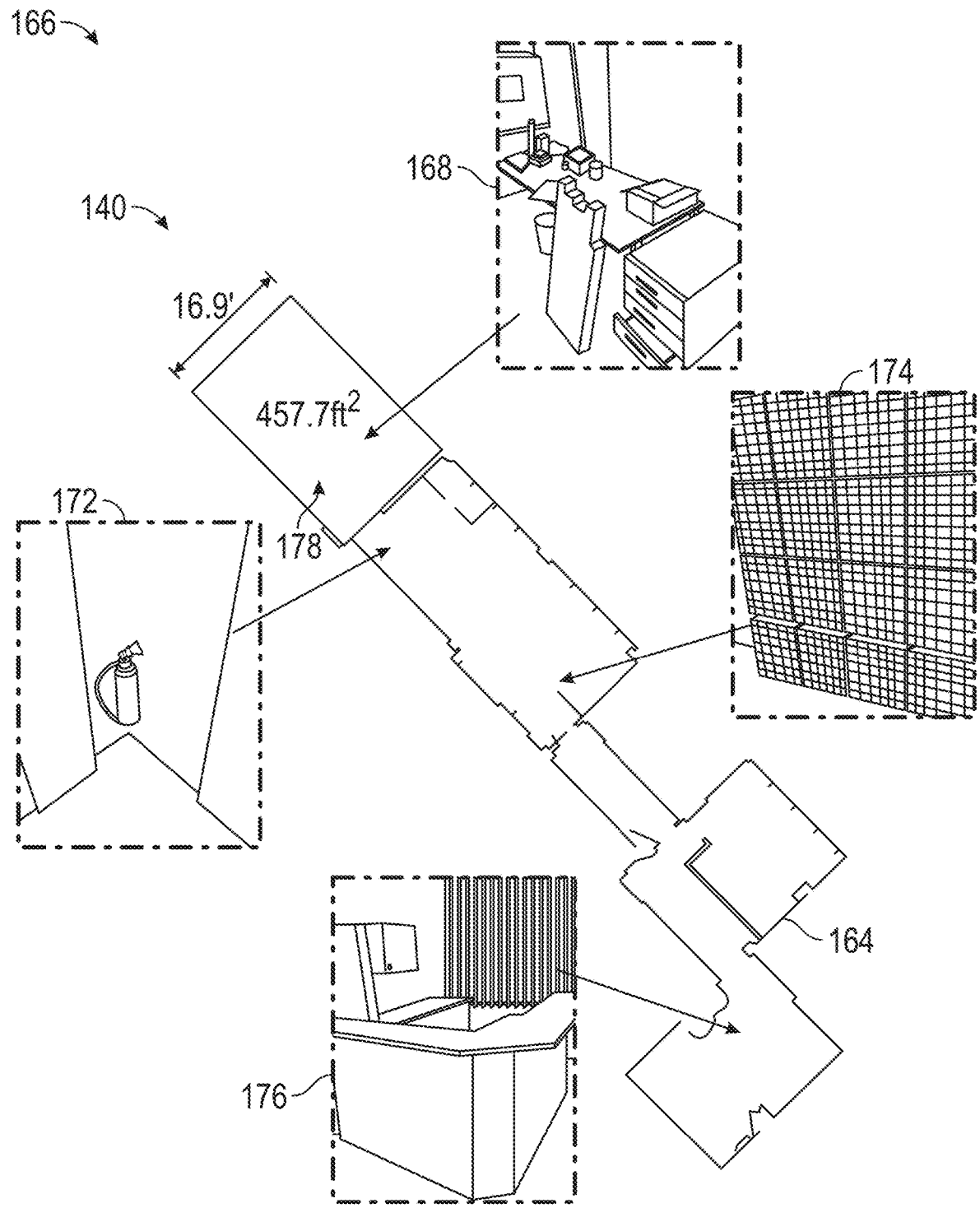
FIG. 23 is an annotated 2D map generated with the method of FIG. 18 in accordance with an embodiment.

The method 150 then proceeds to block 156 where the images and notes are stored in memory, such as memory 80 for example. In an embodiment, the data on the pose of the system 30 is stored with the images and notes. In still another embodiment, the time or the location of the system 30 when the images are acquired or notes were recorded is also stored. Once the scanning of the area or facility is completed, the method 150 then proceeds to block 158 where the 2D map 164 (FIG. 23) is generated as described herein. The method then proceeds to block 160 where an annotated 2D map 166 (FIG. 23) is generated. The annotated 2D map 166 may include user-defined annotations, such as dimensions 140 or room size 178 described herein above with respect to FIG. 20. The annotations may further include user-defined free-form text or hyperlinks for example. Further, in the exemplary embodiment, the acquired images 168 and recorded notes are integrated into the annotated 2D map 166. In an embodiment, the image annotations are positioned to the side of the 2D map 164 the image was acquired or the note recorded. It should be appreciated that the images allow the operator to provide information to the map user on the location of objects, obstructions and structures, such as but not limited to fire extinguisher 172, barrier 174 and counter/desk 176 for example. Finally, the method 300 proceeds to block 162 where the annotated map is stored in memory.

It should be appreciated that the image or note annotations may be advantageous in embodiments where the annotated 2D map 166 is generated for public safety personnel, such as a fire fighter for example. The images allow the fire fighter to anticipate obstructions that may not be seen in the limited visibility conditions such as during a fire in the facility. The image or note annotations may further be advantageous in police or criminal investigations for documenting a crime scene and allow the investigator to make contemporaneous notes on what they find while performing the scan.

Figure 24:
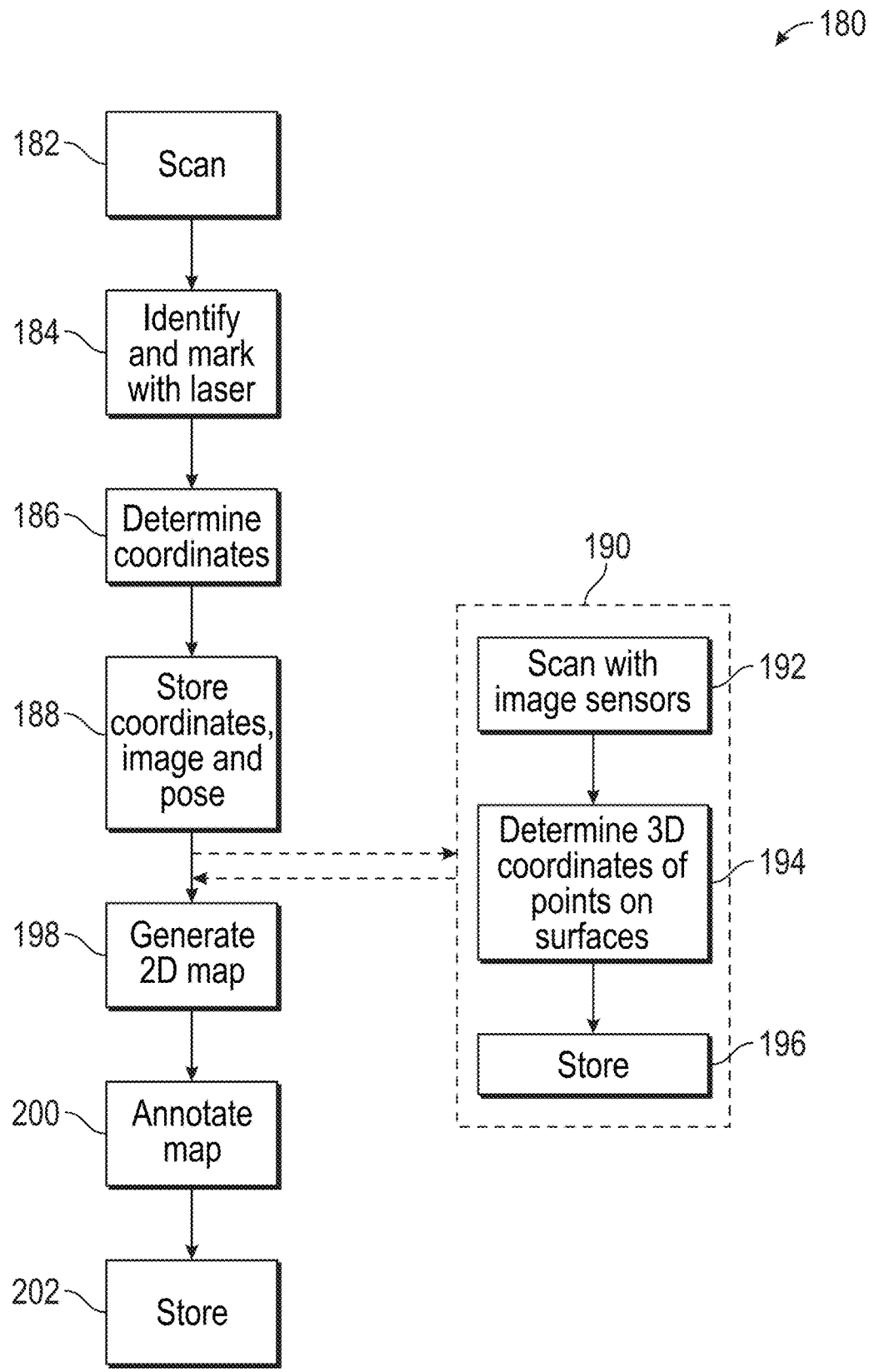
FIG. 24 is a flow diagram of a method of generating a 2D map and a three-dimensional point cloud in accordance with an embodiment.
Figure 25:
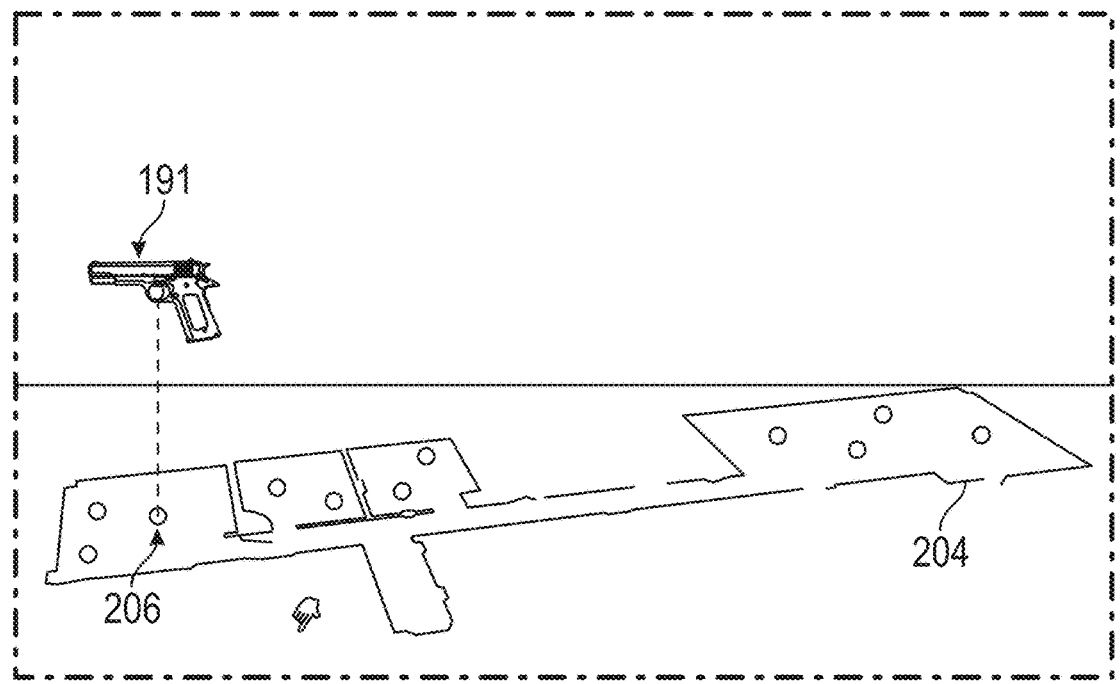
FIGS. 25-26 are views of annotated 2D maps generated with the method of FIG. 24 in accordance with an embodiment.
Figure 26:
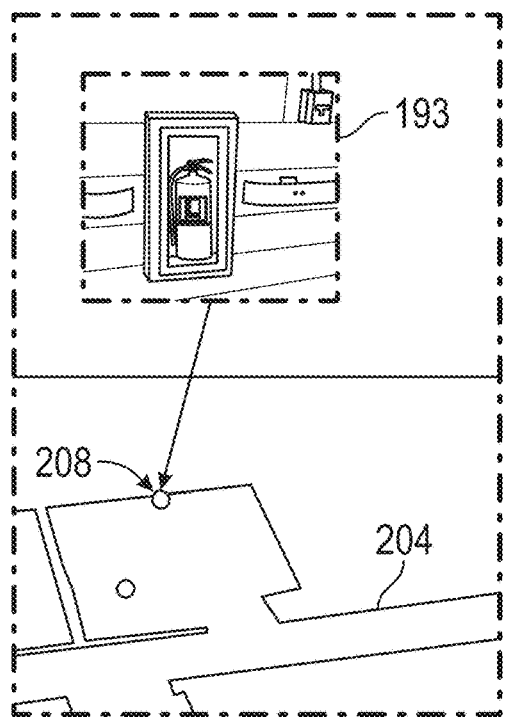

Referring now to FIG. 24, another method 180 is shown of generating a 2D map having annotation that include 3D coordinates of objects within the scanned area. The method 180 begins in block 182 with the operator scanning the area. During the scanning process, the operator may see an object, such as evidence 191 (FIG. 25) or equipment 193 (FIG. 26) for example, that the operator may desire to locate more precisely within the 2D map or acquire additional information. In an embodiment, the system 30 includes a laser projector 76 (FIG. 10) that the operator may activate. The laser projector 76 emits a visible beam of light that allows the operator to see the direction the system 76 is pointing. Once the operator locates the light beam from laser projector 76 on the desired object, the method 180 proceeds to block 186 where the coordinates of the spot on the object of interest are determined. In one embodiment, the coordinates of the object are determined by first determining a distance from system 30 to the object. In an embodiment, this distance may be determined by a 3D camera 60 (FIG. 10) for example. In addition to the distance, the 3D camera 60 also may acquire an image of the object. Based on knowing the distance along with the pose of the system 30, the coordinates of the object may be determined. The method 180 then proceeds to block 188 where the information (e.g. coordinates and image) of the object are stored in memory.

It should be appreciated that in some embodiments, the operator may desire to obtain a three-dimensional (3D) representation of the object of interest in addition to the location relative to the 2D map. In this embodiment, the method 180 proceeds to scanning block 190 and acquires 3D coordinates of points on the object of interest. In an embodiment, the object is scanned with the 3D camera 60 in block 192. The system 30 then proceeds to determine the 3D coordinates of points on the surface of the object or interest in block 194. In an embodiment, the 3D coordinates may be determined by determining the pose of the system 30 when the image is acquired by the 3D camera. The pose information along with the distances and a registration of the images acquired by the 3D camera may allow the generation of a 3D point cloud of the object of interest. In one embodiment, the orientation of the object of interest relative to the environment is also determined from the acquired images. This orientation information may also be stored and later used to accurately represent the object of interest on the 2D map. The method 180 then proceeds to block 196 where the 3D coordinate data is stored in memory.

The method 180 then proceeds to block 198 where the 2D map 204 (FIG. 25, FIG. 26) is generated as described herein. In an embodiment, the location of the objects of interest (determined in blocks 184-186) are displayed on the 2D map 204 as a symbol 206, such as a small circle for example. It should be appreciated that the 2D map 204 may include additional user-defined annotations added in block 200, such as those described herein with reference to FIG. 17 and FIG. 22. The 2D map 204 and the annotations are then stored in block 202.

In use, the map user may select one of the symbols, such as symbol 206 or symbol 208 for example. In response, an image of the object of interest 191, 193 may be displayed. Where the object or interest 191, 193 was scanned to obtain 3D coordinates of the object, the 3D representation of the object of interest 191, 193 may be displayed.

Figure 27:
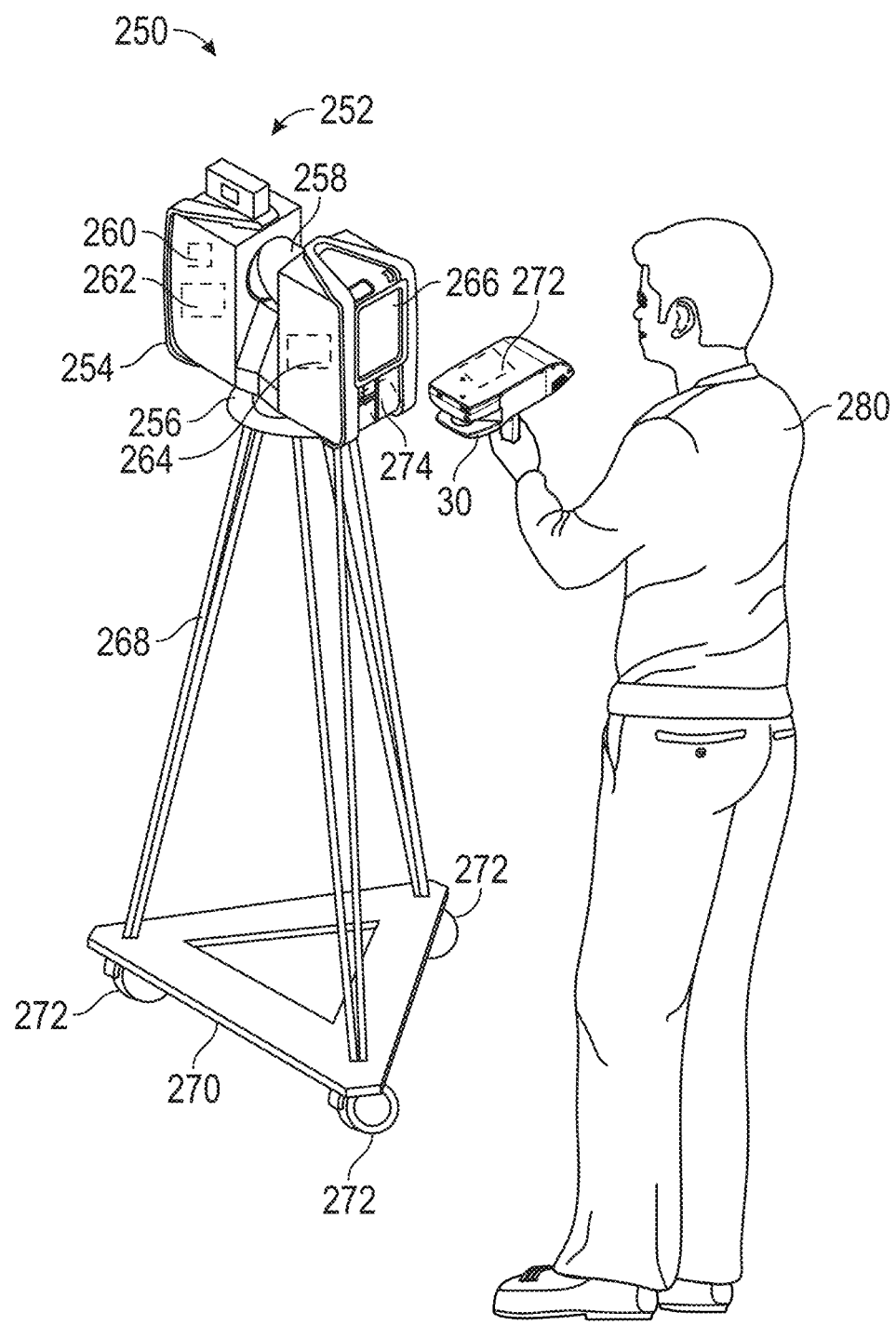
FIGS. 27-28 are views of a mobile mapping system in accordance with an embodiment.
Figure 28:
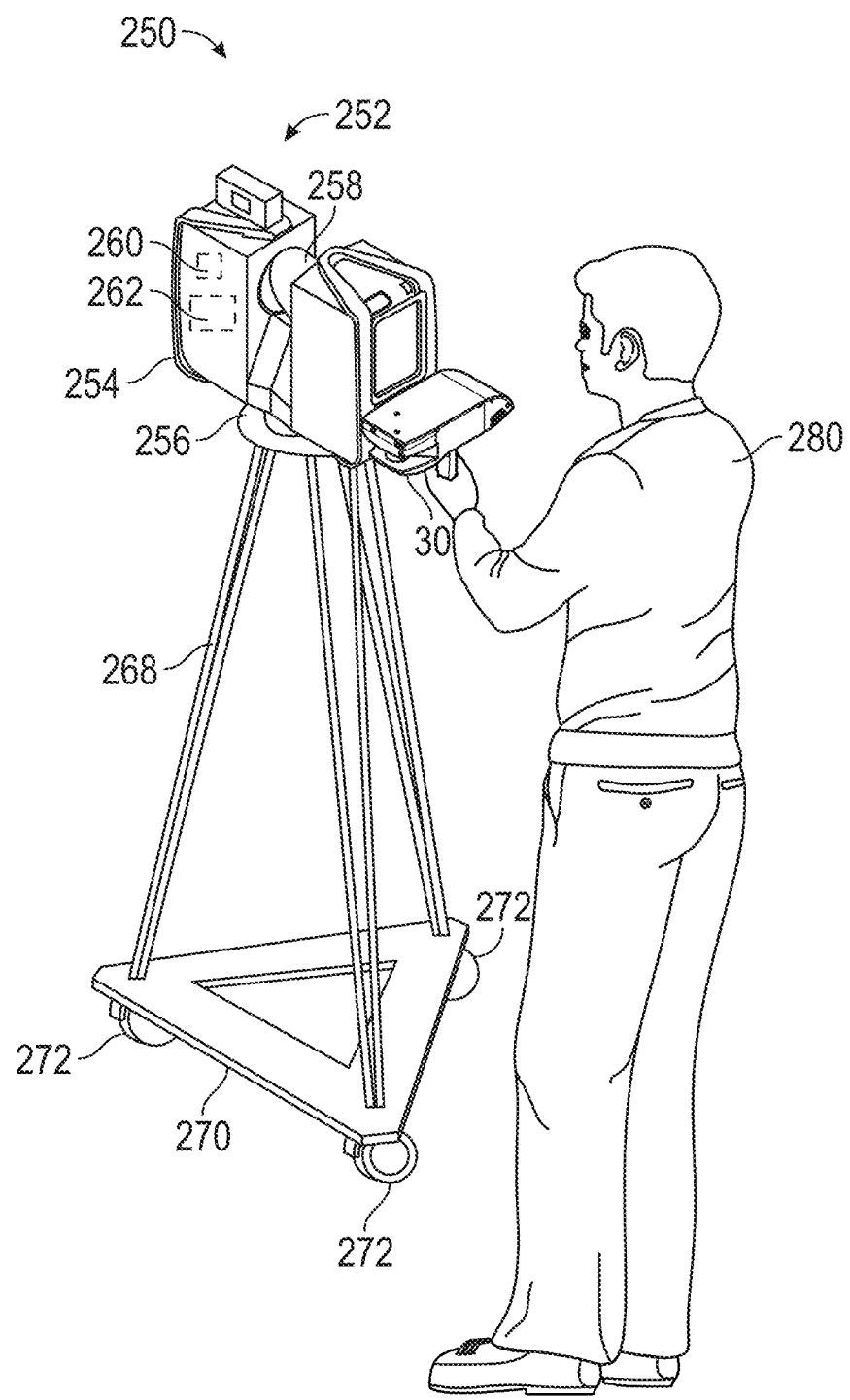

Referring now to FIG. 27 and FIG. 28, an embodiment of a mobile mapping system 250 is shown that includes a 2D scanner 30 and a 3D measurement device 252. In the exemplary embodiment, the 2D scanner 30 is the system 30 described herein with respect to FIGS. 2-8 and the 3D measurement device 252 is a laser scanner 252. The laser scanner 252 may be a time-of-flight type scanner such as the laser scanner described in commonly owned U.S. Pat. No. 8,705,016, the contents of which are incorporated by reference herein.

The laser scanner 252 has a measuring head 254 and a base 256. The measuring head 254 is mounted on the base 256 such that the laser scanner 252 may be rotated about a vertical axis (e.g. an axis extending perpendicular to the surface upon with the laser scanner 252 sits). In one embodiment, the measuring head 254 includes a gimbal point that is a center of rotation about the vertical axis and a horizontal axis. The measuring head 254 has a rotary mirror 258, which may be rotated about the horizontal axis. The rotation about the vertical axis may be about the center of the base 24. In the exemplary embodiment, the vertical axis and the horizontal axis are perpendicular to each other. The terms azimuth axis and zenith axis may be substituted for the terms vertical axis and horizontal axis, respectively. The term pan axis or standing axis may also be used as an alternative to vertical axis.

The measuring head 254 is further provided with an electromagnetic radiation emitter, such as light emitter 260, for example, that emits an emitted light beam 30. In one embodiment, the emitted light beam is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam is amplitude or intensity modulated, for example, with a sinusoidal waveform or with a rectangular waveform. The emitted light beam is emitted by the light emitter 260 onto the rotary mirror 258, where it is deflected to the environment. A reflected light beam is reflected from the environment by an object (e.g. a surface in the environment). The reflected or scattered light is intercepted by the rotary mirror 258 and directed into a light receiver 262. The directions of the emitted light beam and the reflected light beam result from the angular positions of the rotary mirror 258 and the measuring head 254 about the vertical and horizontal axes, respectively. These angular positions in turn depend on the corresponding rotary drives or motors.

Coupled to the light emitter 260 and the light receiver 262 is a controller 264. The controller 264 determines, for a multitude of measuring points, a corresponding number of distances between the laser scanner 252 and the points on object. The distance to a particular point is determined based at least in part on the speed of light in air through which electromagnetic radiation propagates from the device to the object point. In one embodiment the phase shift of modulation in light emitted by the laser scanner 20 and the point is determined and evaluated to obtain a measured distance.

The controller 264 may include a processor system that has one or more processing elements. It should be appreciated that while the controller 264 is illustrated as being integral with the housing of the laser scanner 252, in other embodiments, the processor system may be distributed between a local processor, an external computer, and a cloud-based computer. The processors may be microprocessors, field programmable gate arrays (FPGAs), digital signal processors (DSPs), and generally any device capable of performing computing functions. The one or more processors have access to memory for storing information. In an embodiment the controller 264 represents one or more processors distributed throughout the laser scanner 252.

The controller 264 may also include communications circuits, such as an IEEE 802.11 (Wi-Fi) module that allows the controller 264 to communicate through the network connection, such as with a remote computer, a cloud based computer, the 2D scanner 30 or other laser scanners 252.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

The measuring head 254 may include a display device 266 integrated into the laser scanner 252. The display device 266 may include a graphical touch screen, as shown in FIG. 27, which allows the operator to set the parameters or initiate the operation of the laser scanner 252. For example, the screen may have a user interface that allows the operator to provide measurement instructions to the device, and the screen may also display measurement results.

In an embodiment, the base 256 is coupled to a swivel assembly (not shown) such as that described in commonly owned U.S. Pat. No. 8,705,012, which is incorporated by reference herein. The swivel assembly is housed within the carrying structure and includes a motor that is configured to rotate the measuring head 254 about the vertical axis.

In the exemplary embodiment, the base 256 is mounted on a frame 268, such as a tripod for example. The frame 268 may include a movable platform 270 that includes a plurality of wheels 272. As will be described in more detail herein, the movable platform 270 allow the laser scanner 252 to be quickly and easily moved about the environment that is being scanned, typically along a floor that is approximately horizontal. In an embodiment, the wheels 272 may be locked in place using wheel brakes as is known in the art. In another embodiment, the wheels 272 are retractable, enabling the tripod to sit stably on three feet attached to the tripod. In another embodiment, the tripod has no wheels but is simply pushed or pulled along a surface that is approximately horizontal, for example, a floor. In another embodiment, the optional moveable platform 270 is a wheeled cart that may be hand pushed/pulled or motorized.

In this embodiment, the 2D scanner 30 and the laser scanner 252 each have a position indicator 274, 276 respectively. As is discussed in more detail with respect to FIG. 29, the position indicators may be a radio frequency identification system (RFID), a near field communications system (FIG. 29), a magnetic switch system, a feature or keying arrangement or a machine readable indicia system 38). The position indicators 274, 276, when engaged, allow the system 250 to determine and record the position of the 2D scanner 30 relative to the laser scanner 252. Once the 2D scanner 30 is registered relative to the laser scanner 252, the 2D coordinate measurement data acquired by the 2D scanner 30 may be transformed from a local coordinate frame of reference to a laser scanner coordinate frame of reference. It should be appreciated that this allows the combining of the coordinate data from the 2D scanner 30 and the laser scanner 252.

Figure 29:
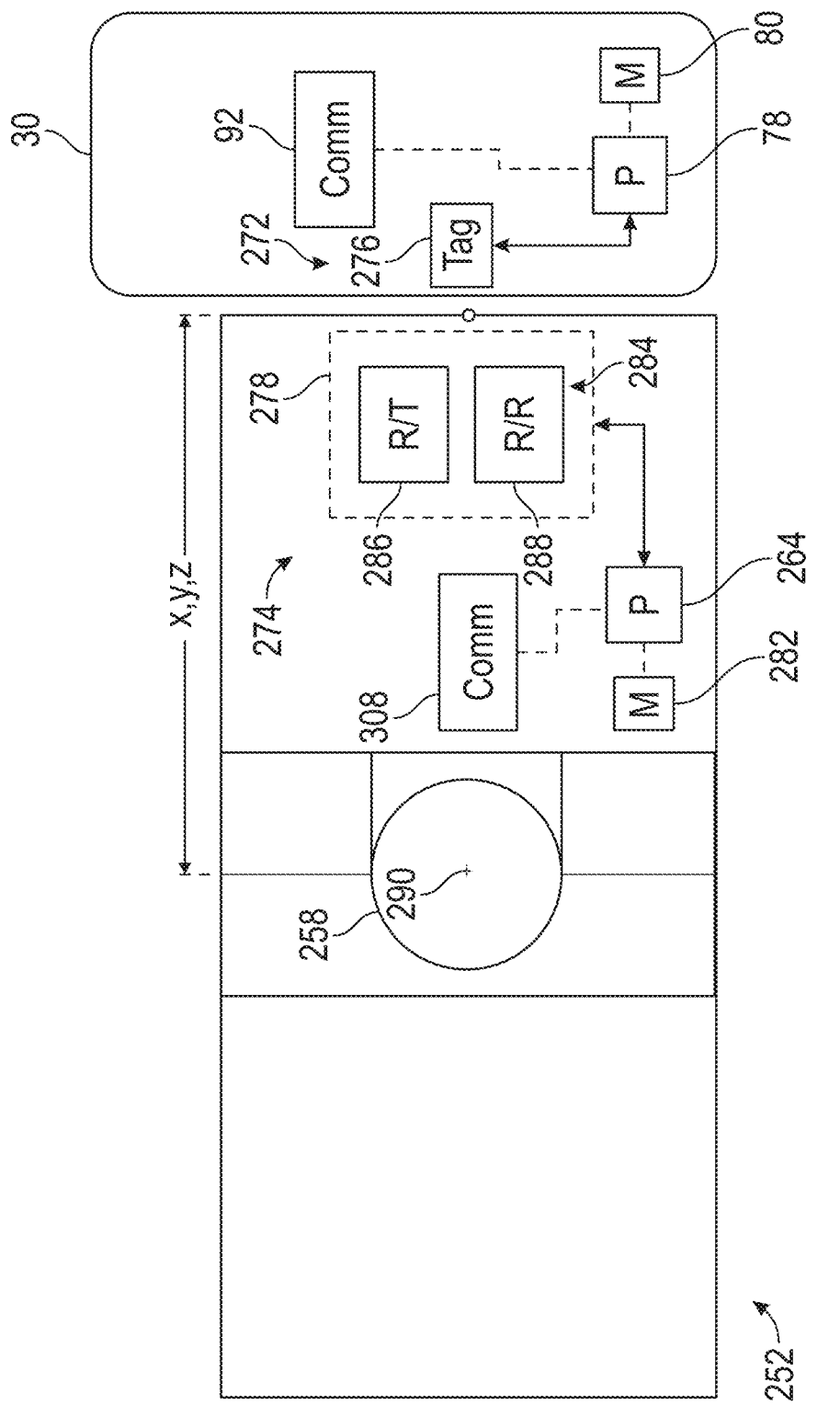
FIG. 29 is a schematic illustration of a laser scanner and hand scanner for the system of FIG. 27.

Referring now to FIG. 29, with continuing reference to FIG. 27 and FIG. 28, an embodiment is shown of the system 250 using near field communications (NFC) for the position indicators 272, 274. A near field communications system typically consists of a tag 276 and a reader 278. The tag 276 and reader 278 are typically coupled to separate devices or objects and when brought within a predetermined distance of each other, cooperate to transfer data there between. It should be appreciated that while embodiments herein describe the tag 276 as being mounted within or coupled to the body of the 2D scanner 30 and the reader 278 as being disposed within the housing of the laser scanner 252, this is for exemplary purposes and the claims should not be so limited. In other embodiments, the arrangement of the tag 276 and reader 278 may be reversed.

As used herein, the term "near field communications" or NFC refers to a communications system that allows for a wireless communications between two devices over a short or close range, typically less than 5 inches (127 millimeters). NFC further provides advantages in that communications may be established and data exchanged between the NFC tag 276 and the reader 278 without the NFC tag 276 having a power source such as a battery. To provide the electrical power for operation of the NFC tag 276, the reader 278 emits a radio frequency (RF) field (the Operating Field). Once the NFC tag 276 is moved within the operating field, the NFC tag 276 and reader 278 are inductively coupled, causing current flow through an NFC tag antenna. The generation of electrical current via inductive coupling provides the electrical power to operate the NFC tag 276 and establish communication between the tag and reader, such as through load modulation of the Operating Field by the NFC tag 276. The modulation may be direct modulation, frequency-shift keying (FSK) modulation or phase modulation, for example. In one embodiment, the transmission frequency of the communication is 13.56 megahertz with a data rate of 106-424 kilobits per second.

In an embodiment, the 2D scanner 30 includes a position indicator 272 that includes the NFC tag 276. The NFC tag 276 may be coupled at a predetermined location of the body of the 2D scanner 30. In an embodiment, the NFC tag 276 is coupled to the side of the 2D scanner 30 to facilitate the operator 280 placing the NFC tag 276 adjacent the laser scanner 252 (FIG. 29). In an embodiment, the NFC tag 276 is coupled to communicate with the processor 78. In other embodiments, the NFC tag 276 is a passive device that is not electrically coupled to other components of the 2D scanner 30. In the exemplary embodiment, the NFC tag 276 includes data stored thereon, the data may include but is not limited to identification data that allows the 2D scanner 30 to be uniquely identified (e.g. a serial number) or a communications address that allows the laser scanner 252 to connect for communications with the 2D scanner 30.

In one embodiment, the NFC tag 276 includes a logic circuit that may include one or more logical circuits for executing one or more functions or steps in response to a signal from an antenna. It should be appreciated that logic circuit may be any type of circuit (digital or analog) that is capable of performing one or more steps or functions in response to the signal from the antenna. In one embodiment, the logic circuit may further be coupled to one or more tag memory devices configured to store information that may be accessed by logic circuit. NFC tags may be configured to read and write many times from memory (read/write mode) or may be configured to write only once and read many times from tag memory (card emulation mode). For example, where only static instrument configuration data is stored in tag memory, the NFC tag may be configured in card emulation mode to transmit the configuration data in response to the reader 278 being brought within range of the tag antenna.

In addition to the circuits/components discussed above, in one embodiment the NFC tag 276 may also include a power rectifier/regulator circuit, a clock extractor circuit, and a modulator circuit. The operating field induces a small alternating current (AC) in the antenna when the reader 278 is brought within range of the tag 276. The power rectifier and regulator converts the AC to stable DC and uses it to power the NFC tag 276, which immediately "wakes up" or initiates operation. The clock extractor separates the clock pulses from the operating field and uses the pulses to synchronize the logic, memory, and modulator sections of the NFC tag 276 with the NFC reader 278. The logic circuit separates the 1's and 0's from the operating field and compares the data stream with its internal logic to determine what response, if any, is required. If the logic circuit determines that the data stream is valid, it accesses the memory section for stored data. The logic circuit encodes the data using the clock extractor pulses. The encoded data stream is input into the modulator section. The modulator mixes the data stream with the operating field by electronically adjusting the reflectivity of the antenna at the data stream rate. Electronically adjusting the antenna characteristics to reflect RF is referred to as backscatter. Backscatter is a commonly used modulation scheme for modulating data on to an RF carrier.

In this method of modulation, the tag coil (load) is shunted depending on the bit sequence received. This in turn modulates the RF carrier amplitude. The NFC reader detects the changes in the modulated carrier and recovers the data.

In an embodiment, the NFC tag 276 is a dual-interface NFC tag, such as M24SR series NFC tags manufactured by ST Microelectronics N.V. for example. A dual-interface memory device includes a wireless port that communicates with an external NFC reader, and a wired port that connects the device with another circuit, such as processor 78. The wired port may be coupled to transmit and receive signals from the processor 78 for example. In another embodiment, the NFC tag 276 is a single port NFC tag, such as MIFARE Classic Series manufactured by NXP Semiconductors. With a single port tag, the tag 276 is not electrically coupled to the processor 78.

It should be appreciated that while embodiments herein disclose the operation of the NFC tag 276 in a passive mode, meaning an initiator/reader device provides an operating field and the NFC tag 276 responds by modulating the existing field, this is for exemplary purposes and the claimed invention should not be so limited. In other embodiments, the NFC tag 276 may operate in an active mode, meaning that the NFC tag 276 and the reader 278 may each generate their own operating field. In an active mode, communication is performed by the NFC tag 276 and reader 278 alternately generating an operating field. When one of the NFC tag and reader device is waiting for data, its operating field is deactivated. In an active mode of operation, both the NFC tag and the reader device may have its own power supply.

In an embodiment, the reader 278 is disposed within the housing of the laser scanner 252. The reader 278 includes, or is coupled to a processor, such as processor 264 coupled to one or more memory modules 282. The processor 264 may include one or more logical circuits for executing computer instructions. Coupled to the processor 560 is an NFC radio 284. The NFC radio 284 includes a transmitter 286 that transmits an RF field (the operating field) that induces electric current in the NFC tag 276. Where the NFC tag 276 operates in a read/write mode, the transmitter 286 may be configured to transmit signals, such as commands or data for example, to the NFC tag 276.

The NFC radio 284 may further include a receiver 288. The receiver 288 is configured to receive signals from, or detect load modulation of, the operating field by the NFC tag 276 and to transmit signals to the processor 264. Further, while the transmitter 286 and receiver 288 are illustrated as separate circuits, this is for exemplary purposes and the claimed invention should not be so limited. In other embodiments, the transmitter 286 and receiver 284 may be integrated into a single module. The antennas being configured to transmit and receive signals in the 13.56 megahertz frequency.

When the 2D scanner 30 is positioned relative to the laser scanner 252, the tag 276 may be activated by the reader 278. Thus the position of the 2D scanner 30 relative to the laser scanner 252 will be generally known due to the short transmission distances provided by NFC. It should be appreciated that since the position of the tag 276 is known, and the position of the reader 278 is known, this allows the transforming of coordinates in the 2D scanner coordinate frame of reference into the laser scanner coordinate frame of reference (e.g. the reference frame having an origin at the gimbal location 290).

Terms such as processor, controller, computer, DSP, FPGA are understood in this document to mean a computing device that may be located within the system 30 instrument, distributed in multiple elements throughout the system, or placed external to the system (e.g. a mobile computing device).

Figure 30:
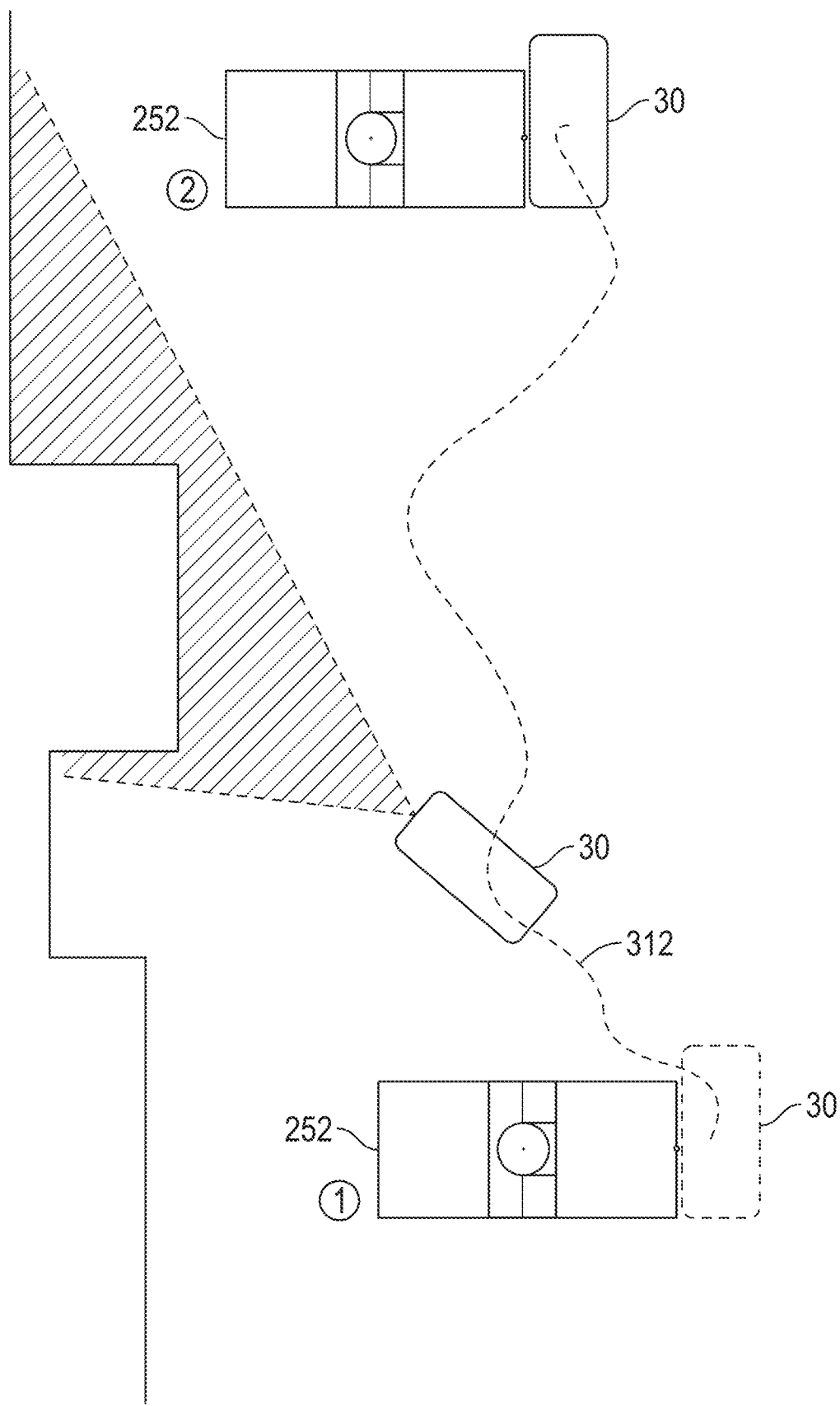
FIG. 30 is a schematic illustration of the operation of the system of FIG. 27.
Figure 31:
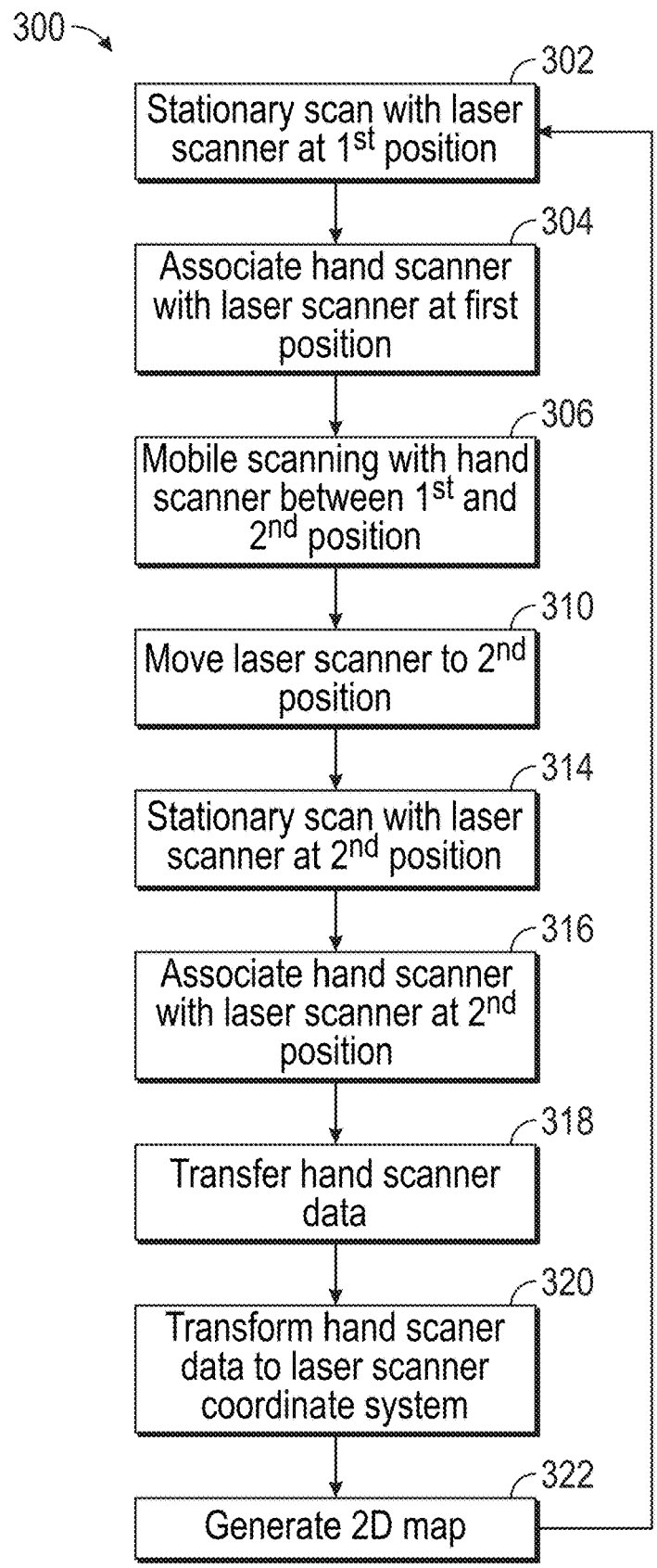
FIG. 31 is a flow diagram of a method of operating the system of FIG. 27.

Referring now to FIGS. 30-31, with continuing reference to FIGS. 27-29, a method 300 is shown of the operation of the system 250. The method 300 begins in block 3021 with the laser scanner 252 performing a scan at a first position. During the scan at the first position (location "1" of FIG. 30), the laser scanner 252 acquires 3D coordinates for a first plurality of points on surfaces in the environment being scanned. The method 300 then proceeds to block 3041 where the 2D scanner 30 is moved adjacent the laser scanner 252 such that the position indicator 272 engages the position indicator 274. In the embodiment of FIG. 29, the placement of the tag 276 within range of the reader 278 allows data to be transferred from the 2D scanner 30 to the laser scanner 252. In an embodiment, the transferred data includes an identification data of the 2D scanner 30. This registers the position and orientation of the 2D scanner 30 relative to the laser scanner 252 at the first position. Once the 2D scanner 30 is registered to the laser scanner 252, the method 300 then proceeds to block 3061 where the 2D scanner 30 is activates. In one embodiment, the 2D scanner 30 is automatically activated by the registration, such as via a signal from the laser scanner communications circuit 3081 to the 2D scanner communications circuit 92 or via NFC. In an embodiment, the 2D scanner 30 continuously scans until the laser scanner 252 and the 2D scanner 30 are registered a second time.

In block 3061, the operator 280 scans the environment by moving the 2D scanner 30 along a path 3121. The 2D scanner acquires 2D coordinate data of the environment as it is moved along the path 3121 in the manner described herein with respect to FIGS. 11-13 with the movement of the 2D scanner being determined based on IMU 74 (FIG. 10). It should be appreciated that the 2D coordinate data is generated in a local coordinate frame of reference of the 2D scanner 30.

The method 300 then proceeds to block 3101 where the laser scanner 252 is moved from the first position to a second position (e.g. location "2" of FIG. 30). The method 300 then proceeds to block 3141 where a second scan of the environment is performed by the laser scanner 252 to acquire the 3D coordinates of a second plurality of points on surfaces in the environment being scanned. Based at least in part on the first plurality of points acquired in the first scan by laser scanner 252 in block 3021 and the second plurality of points acquired in the second scan by laser scanner 252 in block 3141, a correspondence between registration targets may be determined. In the exemplary embodiment, the registration targets are based on natural features in the environment that are common to both the first and second plurality of points. In other embodiments, artificial targets may be manually placed in the environment for use in registration. In an embodiment, a combination of natural features and artificial targets are used for registration targets.

It should be appreciated that once the registration targets are identified, the location of the laser scanner 252 (and the origin of the laser scanner frame of reference, e.g. gimbal point 290) in the second position relative to the first position is known with a high level of accuracy. In an embodiment, the accuracy of the laser scanner 252 between the first position and the second position may be between 1 mm-6 cm depending on the environment. In an embodiment, a registered 3D collection of points is generated based on a correspondence among registration targets, the 3D coordinates of the first collection of points, and the 3D coordinates of the second collection of points.

The method 300 then proceeds to block 3161 where the 2D scanner 30 is once again moved adjacent the laser scanner 252 (now in the second position) to engage the position indicator 272 and position indicator 274. The engagement of the position indicators 272, 274, registers the position and orientation of the 2D scanner 30 relative to the laser scanner 252. In an embodiment, this second registration of the 2D scanner 30 causes the 2D scanner 30 to stop scanning. In an embodiment, blocks 3141, 3161 are reversed and the registration of the 2D scanner 30 causes the laser scanner to automatically perform the second scan of block 3141.

With the 2D scanner 30 registered, the method 300 then proceeds to block 3181 where the 2D coordinate data acquired by 2D scanner 30 is transferred. In an embodiment, the 2D coordinate data is transferred. In one embodiment, the 2D coordinate data is transferred to the laser scanner 30. In another embodiment, the 2D coordinate data is transferred to one or more external or remotely located computers along with the registered 3D collection of points.

The method 300 then proceeds to block 3201 where the transferred 2D coordinate data is transformed from the 2D scanner local coordinate frame of reference to the laser scanner coordinate frame of reference. It should be appreciated that with the 2D coordinate data in the laser scanner coordinate frame of reference, the 2D coordinate data may be adjusted as the initial position (e.g. the first position of laser scanner 252) and the final position (e.g. the second position of laser scanner 252) are known with a high degree of accuracy. This provides advantages in improving the accuracy of the 2D coordinate data with the flexibility of a hand held 2D scanner.

With the 2D coordinate data transformed into the laser scanner coordinate frame of reference, the method 300 then proceeds to block 3221 where a 2D map of the environment is generated based at least in part on the transformed 2D coordinate data and the registered 3D collection of points. It should be appreciated that in some embodiments, the method 300 may then loop back to block 3061 and additional scanning is performed. The scan performed by the laser scanner at the second position then becomes the effective first position for the subsequent execution of method 300. It should further be appreciated that while the method 300 is shown as a series of sequential steps, in other embodiments, some of the blocks of method 300 may be performed in parallel. Accordingly, the system 250 continuously creates a 2D map of the environment. Based on the incoming data of the laser scanner 252 or of the 2D scanner 50 and the IMU 74, the system 250 builds a 2D map of the environment that has the information about its position at any time.

Figure 32:
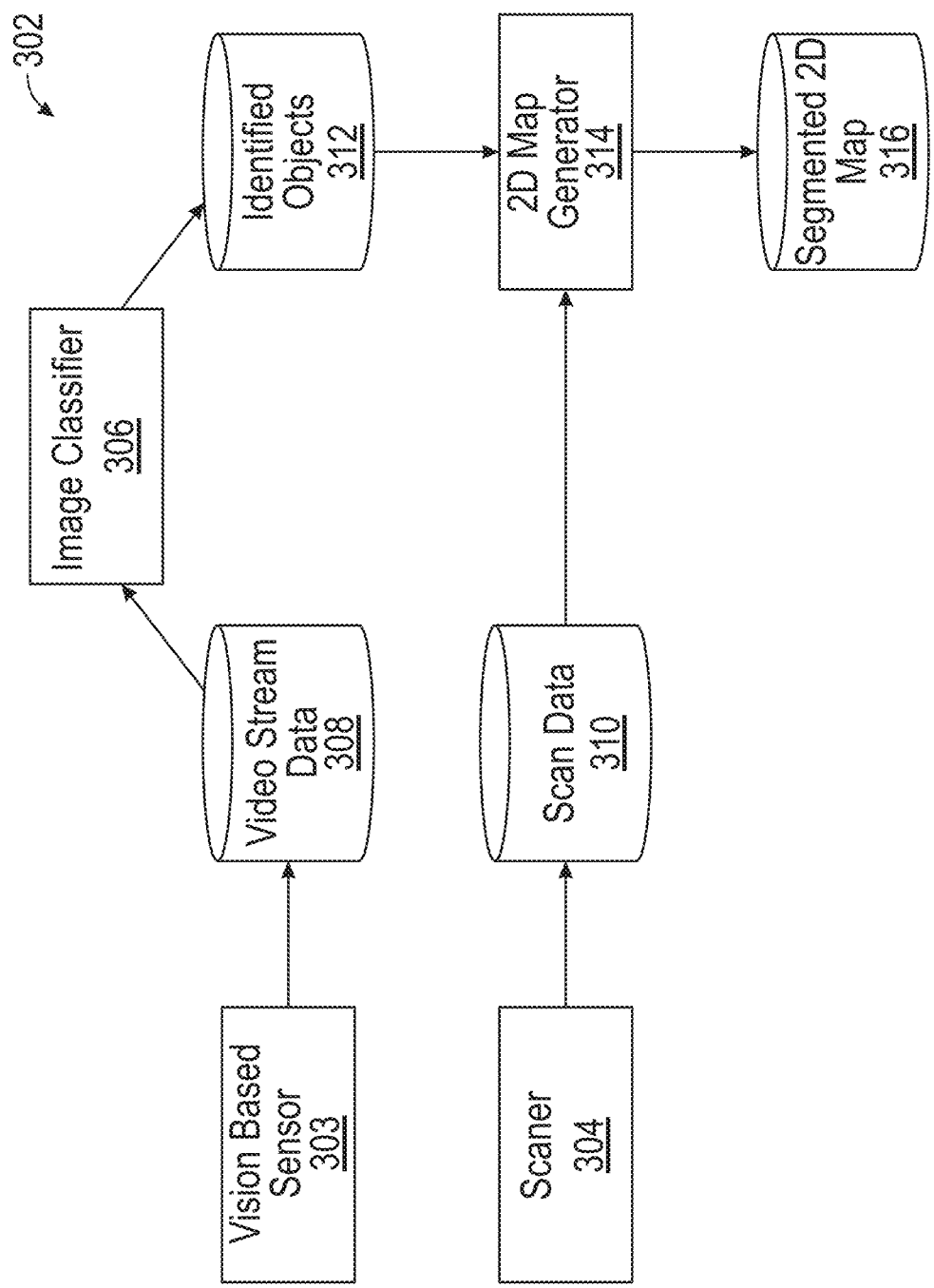
FIG. 32 is a flow diagram of a process for utilizing output from a vision based sensor in conjunction with scan data to facilitate automatic room segmentation in accordance with an embodiment.

Turning now to FIG. 32, a flow diagram 302 of a mapping system for utilizing output from a vision based sensor in conjunction with scan data to facilitate automatic room segmentation is generally shown in accordance with an embodiment of the present invention. The flow diagram shown in FIG. 32 automatically extracts wall lines (e.g., based on locations of windows and doors) from a 2D map and then performs automatic room segmentation based at least in part on the extracted wall lines. In addition, the processing shown in FIG. 32 can be utilized for providing descriptive labels for objects in the 2D map and for rooms in a floorplan of a 2D map based on contents of the rooms.

The 2D maps provided by the processes and apparatuses described above allow the user to capture the geometry/shape of a given environment at different points in time. Embodiments described herein add additional context information to the 2D maps to describe the functionality of the different rooms in the environment as well as the location of additional geometric primitives (e.g., lines, etc.). Applying labels to a 2D map facilitates a user sharing information about the environment with others without having to spend time describing the 2D map. While the user that mapped the environment can identify the different regions and rooms of the environment in the 2D map, other users that were not present during the mapping task or in the same environment might struggle to link the different areas of the 2D floorplan to the different rooms of the mapped environment. An embodiment of the present invention provides the processing flow shown in FIG. 32 to allow a scanner, such as 2D scanner 50 described above, in conjunction with an image sensor to automatically identify rooms and areas of interest in a 2D map generated by a scanner such as those shown in 2D map 22 in FIG. 1 and 2D map 350 in FIG. 36.

As shown in FIG. 32, scan data 310 is generated by a scanner 304, and video stream data 308 is generated by an image or vision based sensor 303. The scanner 304 can be implemented, for example, by 2D scanner 50 described above. In an embodiment, the vision based sensor 303 is implemented by a camera or video recorder or other image sensor located in a mobile computing device (e.g. personal digital assistant, cellular phone, tablet or laptop) carried by the operator for example. In an embodiment, the system 30 described above includes a holder (not shown) that couples the mobile computing device to the system 30. In an alternate embodiment, the vision based sensor 303 is implemented by the 3D camera 60.

As shown in FIG. 32, the scan data 310 is input to the 2D map generator 314 and the video stream data 308 made up of individual images is input to an image classifier 306. As used herein, the term "video" or "video stream data" refers to a series of sequential images acquired by the vision based sensor at a predetermined frame rate, such as 30 frames per second (fps) or 60 frames per second for example. The image classifier 306 analyzes the images in the video stream data 308 to identify objects such as doors and windows. The identified objects are stored in an identified object database 312 and are output by the image classifier 306 and input to the 2D map generator 314. The 2D map generator 314 generates a 2D map using for example, the processing described herein in reference to block 124 of FIG. 17 or block 158 of FIG. 22. In addition, the 2D map is segmented into rooms, or areas, based at least in part on where the identified objects are located in the 2D map. For example, locations of the doors and window can be added to the 2D map to define wall lines which can be used in segmenting the space into rooms and/or areas of interest. In an embodiment where a handheld scanner is used, the location of the object in the image is determined by a mapping/localization algorithm executing on the handheld scanner. When the object is detected, the object position can be determined by taking into account the hand held scanner position and the mobile device position relative to the handheld scanner.

In addition, to defining additional wall lines for use in automatic segmentation, the components shown in FIG. 32 can be used to label the rooms in the segmented 2D map stored in the segmented 2D map database 316 based on contents of the rooms as shown in the video stream data 308. For example, the image classifier 306 can be trained to recognize common household or office objects. The recognized objects are stored in the identified objects database 312 with, for example, a label indicating a type of the object and a location, or coordinates, of the object in the 2D map. The 2D map generator 314 can include logic that labels a room based on the objects that it contains. The segmented 2D map is output by the 2D map generator 314 to a user and/or to the segmented 2D map database 316.

In one or more embodiments, the segmented 2D map database 316 stores multiple copies of a 2D map of the same location taken at different times during different mapping sessions. In addition, the identified objects database 312 stores object identifiers and coordinates of identified objects in each of the multiple copies of the 2D map that were generated at the different points in time.

Figure 33:
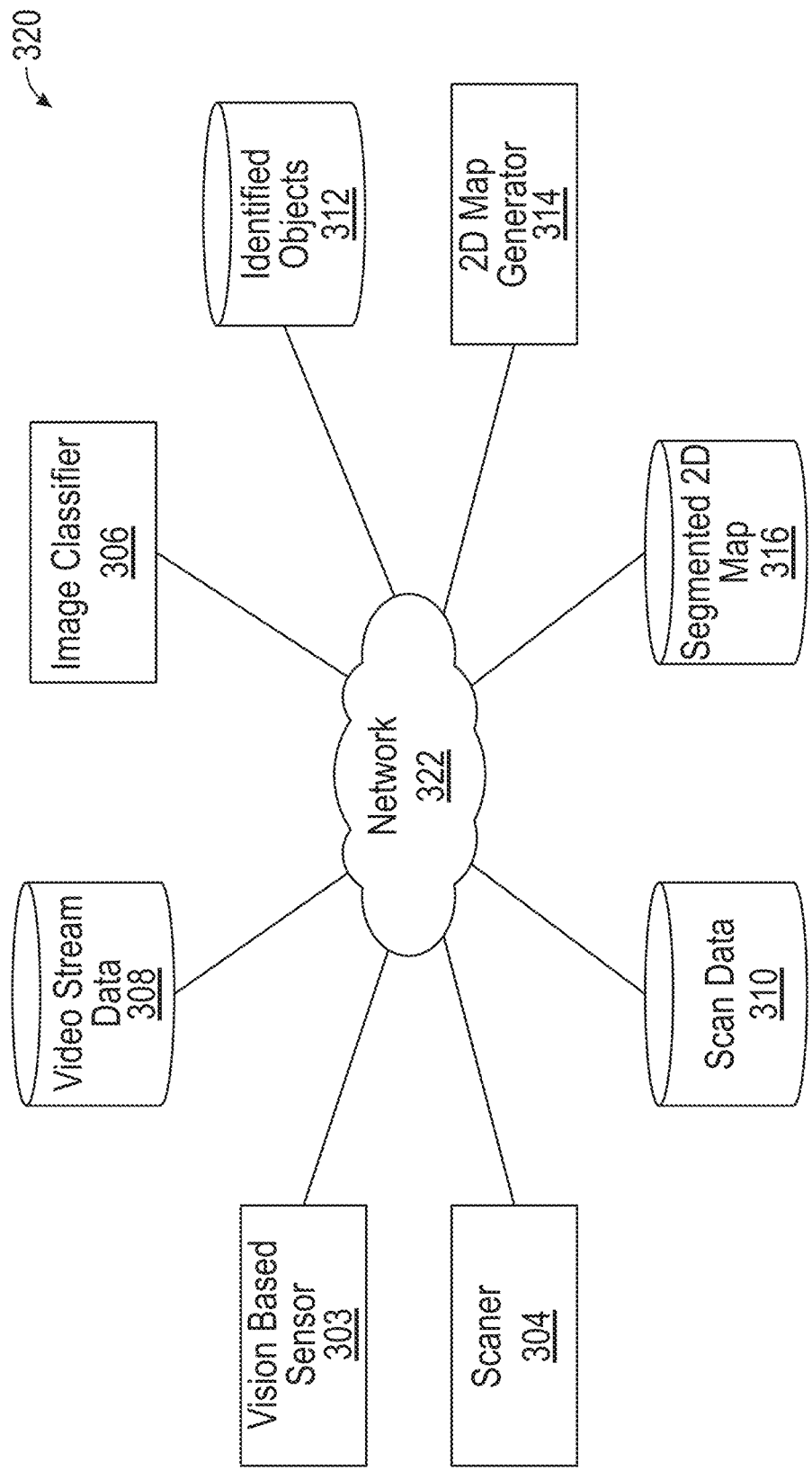
FIG. 33 is a schematic diagram of components of the flow diagram shown in FIG. 32 in accordance with an embodiment.

Turning now to FIG. 33, a schematic diagram 320 of components of the mapping system shown in FIG. 32 is generally shown in accordance with one or more embodiments of the present invention. In the embodiment shown in FIG. 33, all of the components are accessible via network 322. In another embodiment (not shown) the components shown in FIG. 32 are all located on the same system, such as system 30 described herein. In another embodiment, only a subset of the components shown in FIG. 32 is located on the system 30. For example, the vision based sensor 303 and the scanner 304 can both be located on the system 30, the image classifier 306 located on a first processor, and the 2D map generator 314 located on a second processor.

The network 322 shown in FIG. 33 can include one or more of any type of known networks including, but not limited to, a wide area network (WAN), a local area network (LAN), a global network (e.g. Internet), a virtual private network (VPN), and an intranet. The network 322 can include a private network in which access thereto is restricted to authorized members. The network 322 can be implemented using wireless networking technologies or any kind of physical network implementation known in the art. The components shown in FIG. 33 may be coupled to one or more other components through multiple networks (e.g., Internet, intranet, and private network) so that not all components are coupled to other components through the same network 322.

Figures 34, 35:
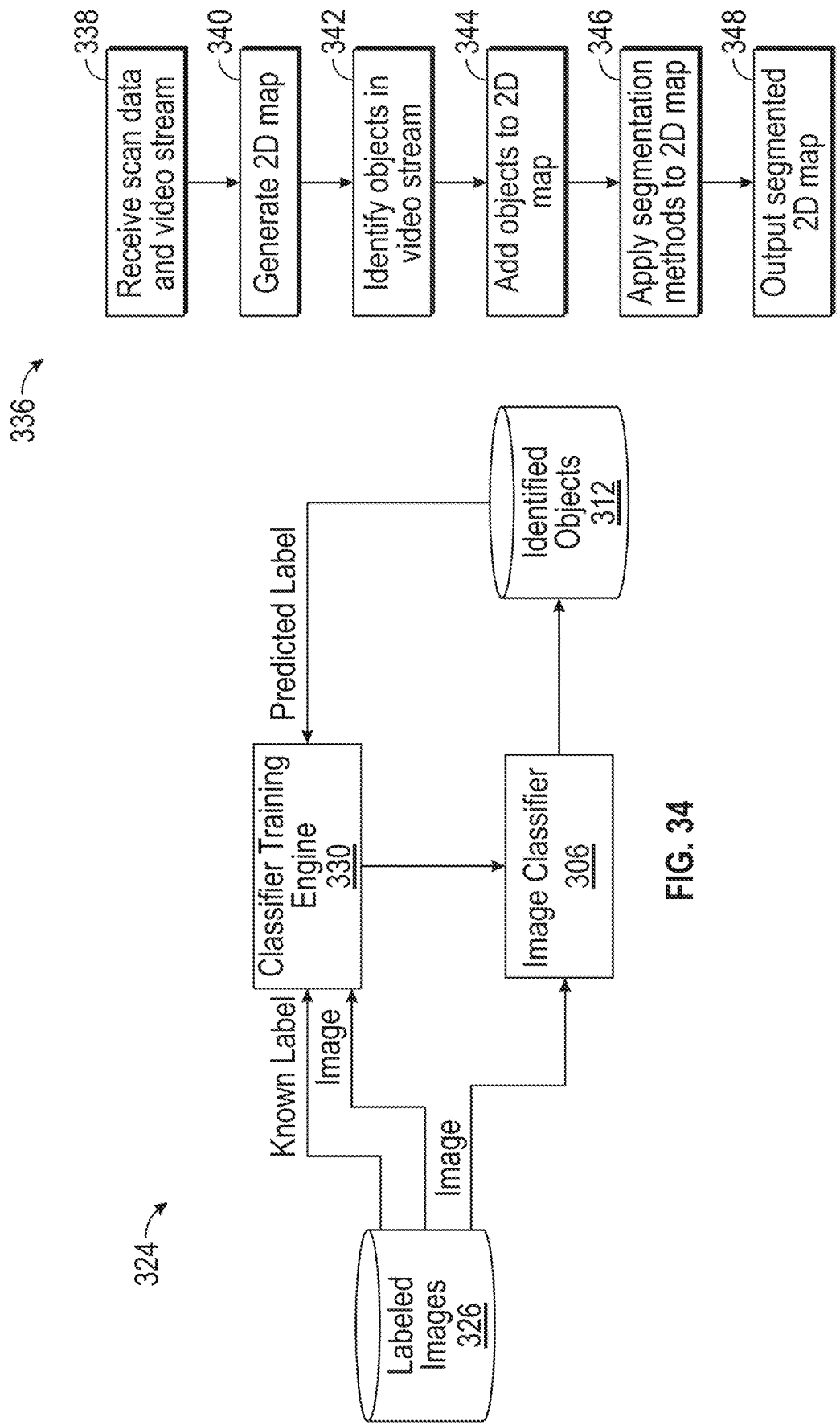
FIG. 34 is a flow diagram of process for training an image classifier to recognize objects in image data in accordance with an embodiment.
FIG. 35 is a flow diagram of a process for generating a 2D map in accordance with an embodiment.

In an embodiment, the artificial intelligence based image classifier 306 is a neural network inference engine. As shown in FIG. 34, training data includes labeled images 326 which include images and their corresponding known labels that have been previously generated by a human analyst. For each image label pair in the labeled images 326, the image portion is input to the image classifier 306, and the image classifier 326 outputs a label of an identified object, or a predicated label. The predicted label for the image is compared, by the classifier training engine 330 to the known label. Based on the results of the comparison, the classifier training engine 330 may update the image classifier 306.

The classifier training engine 330 can use a loss function to compare a predicted label with a known label. The results of the comparison can be used by the classifier training engine 330 to determine adjustments to neural network biases and weightings to improve accuracy and reduce the loss function. The determined adjustments are input to the image classifier 306. The process shown in FIG. 34 can be repeated iteratively to minimize the loss function and maximize the accuracy of predictions. In one or more embodiments of the present invention, portions of the neural network shown in FIG. 34 are implemented by off-the-shelf software. For example, Python and C++ frameworks such as, but not limited to TensorFlow™, PyBrain, Theano, Torch, and Caffe can be used to implement the neural network.

In an embodiment, the labeled images 326 used for training include doors and windows. In an embodiment, the labeled images 326 used for training include objects that can helpful in identifying a descriptive label for a room in a 2D floorplan (e.g., kitchen, bathroom, etc.). For example, the room can be labeled as a bathroom if it has a shower or as a kitchen if it contains a stove. The labeled images 326 that are used to train the image classifier can be created by a third party. For example, IKEA® has an image library that contains labeled images of products sold by IKEA. Depending on the application and what objects a user wants the system to recognize, any types of labeled images can be used as training data. For example, in an embodiment the labeled images 326 include safety items such as, but not limited to: fire extinguishers, fire alarms, smoke detectors, sprinkler systems, and exit door signs.

In embodiments, objects can also be recognized using methods such as region-based convolutional neural networks (R-CNNs) and you only look once (YOLO) real-time object recognition, or other methods that rely on qualitative spatial reasoning (QSR).

Turning now to FIG. 35, a flow diagram 336 of a process for generating a 2D map, including automatically segmenting rooms in the 2D map, is generally shown in accordance with an embodiment of the present invention. The process shown in FIG. 35 can be implemented by computer instructions executing on a processor. The process shown in FIG. 35 identifies doors and windows in the environment being scanned prior to performing segmentation processing. This results in segments that more accurately reflect the actual environment when compared to contemporary approaches.

Figure 36:
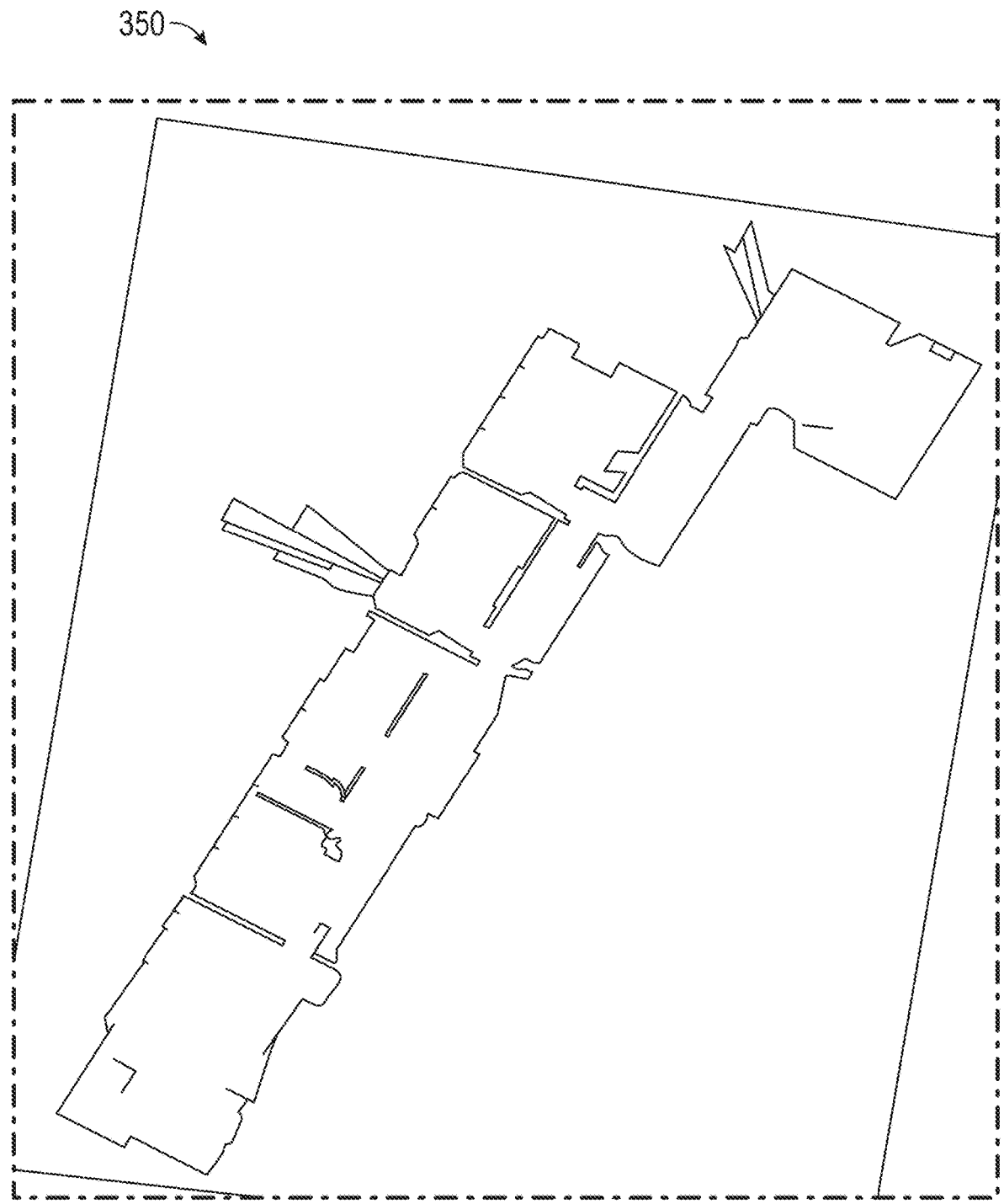
FIG. 36 is an example of a 2D map generated based on scan data in accordance with an embodiment.

At block 338, scan data is received from a scanner, and corresponding video stream data is received from a vision based sensor. At block 340 a 2D map is generated using for example, the processing described herein in reference to block 124 of FIG. 17 or block 158 of FIG. 22. FIG. 36 depicts an example of a 2D map 350 generated based on scan data in accordance with an embodiment of the present invention.

An example of a 2D map 352 generated at block 340 is shown in FIG. 36. At block 342, an image classifier identifies objects in the video stream data at locations in the 2D map. Processing continues at block 344 where the objects identified at block 342 are added to the 2D map. As described previously, AI-based object recognition methods can be used to identify doors and windows, which can be explicitly added to the 2D map at block 344 as geometric elements (lines). The added geometric elements can be used to close the corresponding areas and improve the differentiation of the different rooms. In addition, the identified objects are stored in the identified objects database 312 which can include for each object a type of object (e.g., door, window) and a location (e.g., 2D or 3D coordinates) of the object in the 2D map. An annotated 2D map can be generated by overlaying contents of the identified objects database 312 on a corresponding 2D map.

At block 346, one or more segmentation algorithms are applied to the 2D map with the added geometric elements. Types of automatic segmentation that can be applied include, but are not limited to morphological segmentation, Voronoi segmentation, and/or distance-based segmentation. In morphological segmentation erosion is iteratively applied to the 2D map (binary image). Whenever erosion is performed, the method looks for separate regions and marks them so they are not part of the search in the next iteration. Voronoi segmentation includes computing a Voronoi diagram over the 2D map. A Voronoi diagram includes the partitioning of a plane with n points into convex polygons such that each polygon contains exactly one generating point and every point in a given polygon is closer to its generating point than to any other point. The different points in the Voronoi diagram are then grouped, and for each group of points, a search for the point with the smallest distance to occupied cells in the 2D map is conducted, which is then connected to the two closest occupied cells, creating a "frontier." This is performed to every group of points resulting in separation of the different areas of the map, each of these areas are then marked as a different room. In distance-base segmentation a distance transform is calculated over the 2D map in order to identify the center of the room (local maxima). The room centers are then labeled and extended into the non-labeled space using wave front propagation.

Figure 37:
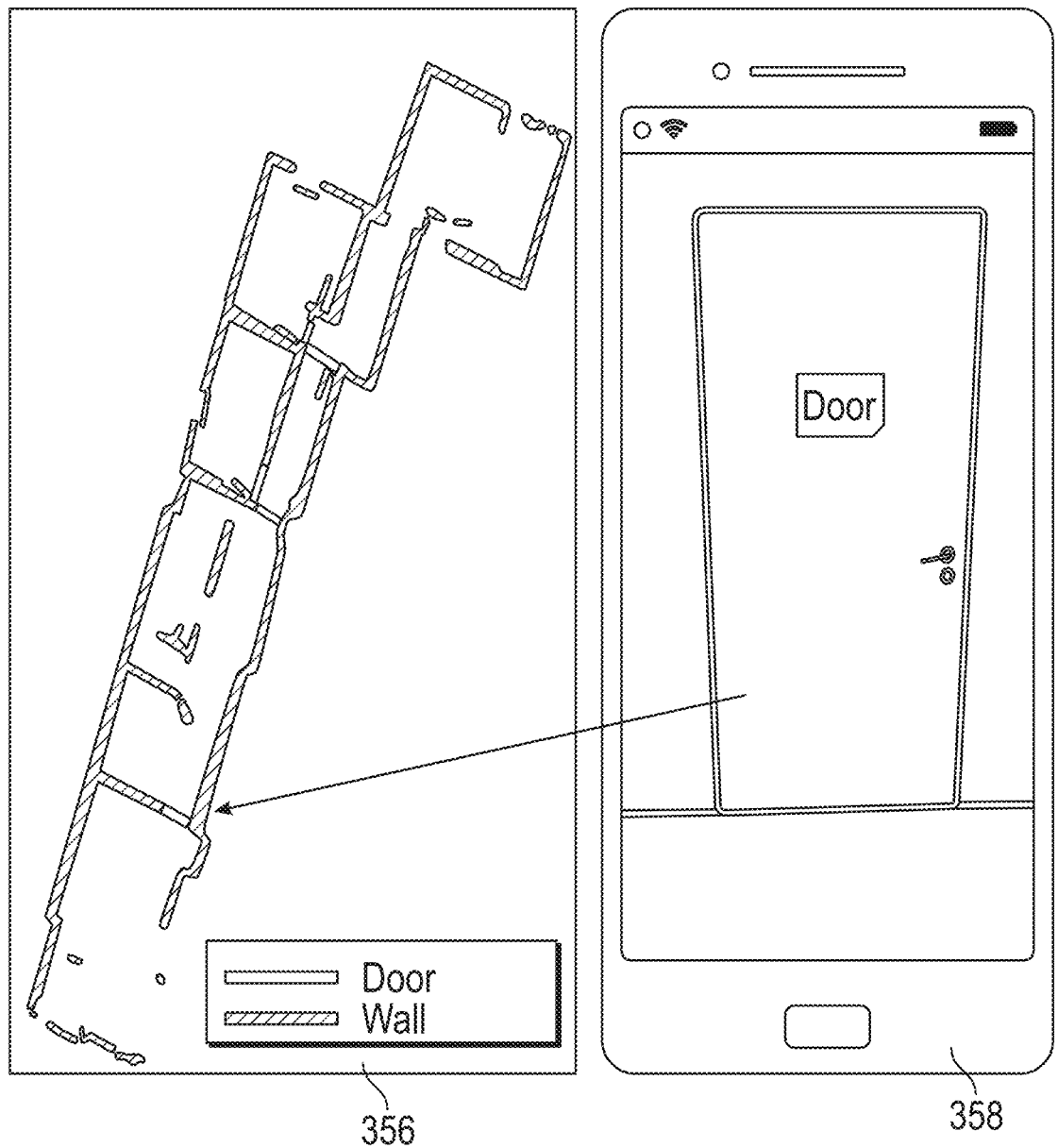
FIG. 37 is an example of a 2D map generated using automatic segmentation that takes into account locations of doors and windows in accordance with an embodiment.
Figure 38:
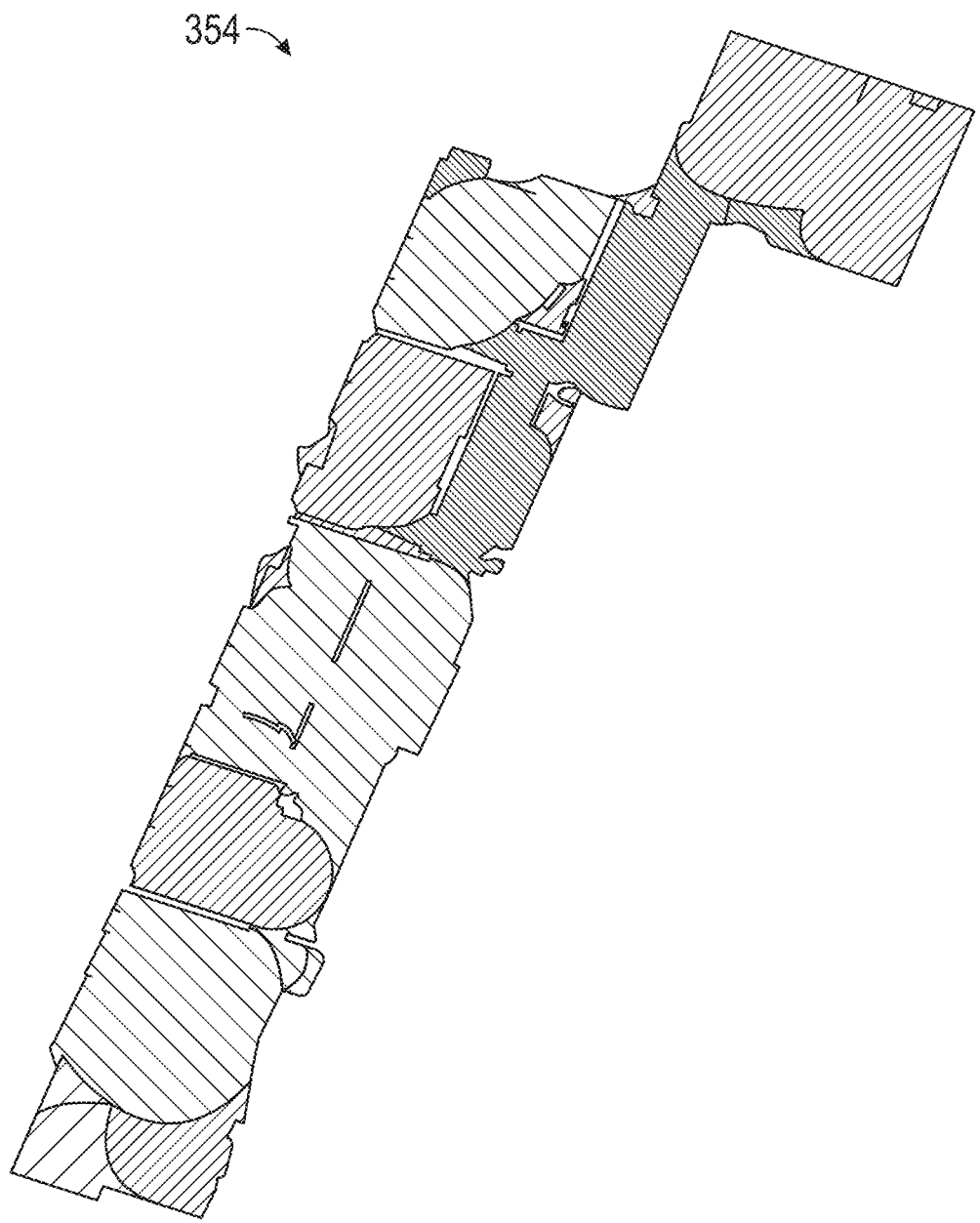
FIG. 38 is an example of a 2D map generated using automatic segmentation that does not take into account the locations of doors and windows.

At block 348, the automatically segmented 2D map is output for storage in a storage device and/or output to a display. FIG. 37 depicts an example of a 2D map 352 that was automatically segmented based on the locations of doors and windows in accordance with an embodiment of the present invention. The 2D map 352 in FIG. 37 is contrasted with 2D map 354 shown in FIG. 38 which is an example of a 2D map 354 automatically segmented without adding door and window location information to the 2D map prior to performing the segmentation.

In an embodiment, the AI-based object recognition method performed at block 344 is combined with a line/wall detection algorithm in order to perform the room segmentation. Utilizing a line/wall detection algorithm has the positive side effect of creating geometric data that can be used for CAD export. The AI-based object recognition process and 2D map generation described previously identifies and labels door locations. In an embodiment, a method to identify walls or segments of lines is applied (e.g. a filter chain including erosion, dilation, Canny, Hough lines) using the identified door locations resulting in a map such as that shown in FIG. 39. In an embodiment, walls and segments of walls are identified directly on a 2D map built by a handheld scanner using a line detection algorithm. In some cases doors are built in a way that their shape can be identified in 2D by detecting the points in which the laser data goes slightly inside the wall and there is a symmetry between points. In addition, if the distance in between two points is more or less the same length of a door, it can be considered it a door. However, as this method is not always reliable and can result in a lot of false positives, it is combined with the application of an object recognition method to the output of a vision based sensor. The combination of both methods is used in an embodiment to identify doors and place a visual marker or label in the 2D map.

FIG. 37 shows the resulting 2D map 356 and an example image of a door 358. Assuming that each door represents the entrance to a new room and that each room is delimited by the walls identified previously, the method can easily identify bounded or defined spaces such as rooms or hallways in the 2D map without performing complex morphological operations. In an embodiment this is performed by closing the open segments where the doors are located with a geometric line. The algorithm searches for consecutive loop-closed line segments.

Figure 39:
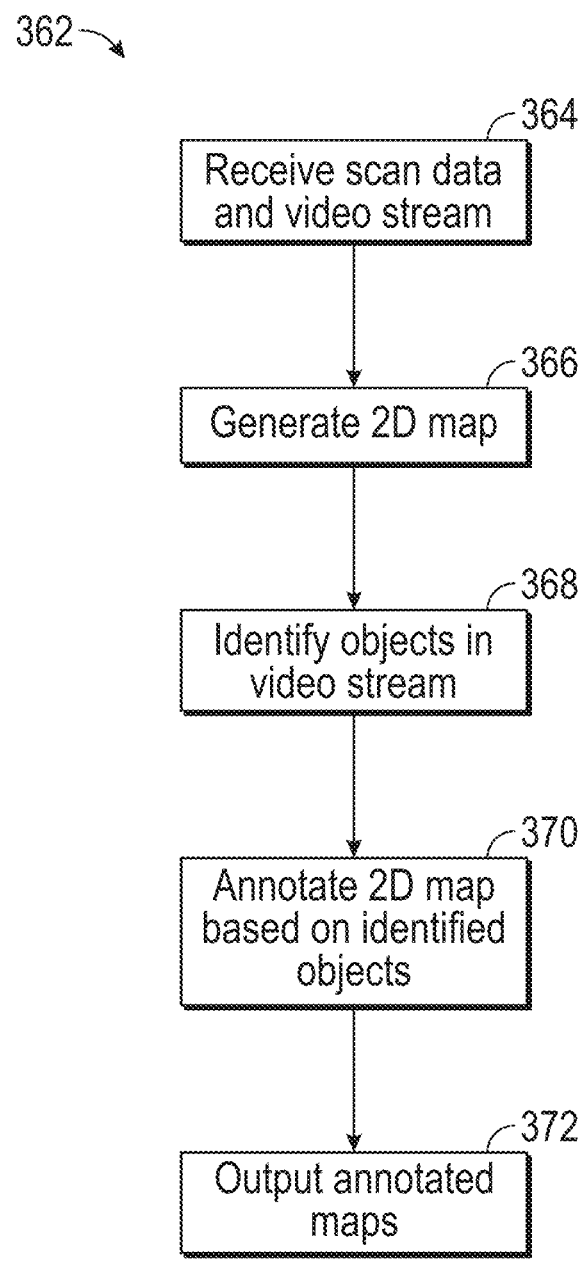
FIG. 39 is a flow diagram of a process for annotating a 2D map in accordance with an embodiment.

Turning now to FIG. 39, a flow diagram 362 of a process for annotating a 2D map is generally shown in accordance with an embodiment. The process shown in FIG. 39 can be implemented by computer instructions executing on a processor. Descriptive labels for segments, or rooms, in a 2D map are generated using AI to identify objects in the room, and then by applying a label based on the identified objects. For example, if a room contains a stove and a refrigerator, then it can be given the label "kitchen", and if the room contains a table and chairs but no stove or refrigerator then it can be labeled "dining room." The labeling is not limited to households. For example in an workplace, a room having an office chair and a computer monitor can be labeled "office" and a room having a long table and several office chairs can be labeled "conference room."

At block 364, scan data is received from a scanner, and corresponding video stream data is received from a vision based sensor. At block 366, a 2D map is generated using for example, the processing described herein in reference to block 124 of FIG. 17 or block 158 of FIG. 22. An example of the 2D map generated at block 304 is shown in FIG. 36. At block 368, an image classifier, such as image classifier 306 in FIG. 32, identifies objects in the video stream data at locations in the 2D map. Processing continues at block 370 where the 2D scan is annotated based on the identified objects. In addition, the identified objects are stored in the identified objects database 312 which can include for each object a type of object (e.g., fire alarm, fire extinguisher) and a location of the object in the 2D map. At block 372, the annotated 2D map is output for storage in a storage device and/or output to a display. An example of an annotated 2D map is 2D map 24 of FIG. 1. In an embodiment, the annotated 2D map is stored in two parts: the segmented 2D map stored in the segmented 2D map database 316 and its corresponding identified objects in the identified objects database 312. In another embodiment, both parts of the annotated 2D map are stored together in a storage device (not shown).

In an embodiment, blocks 368-372 are performed after block 346 in FIG. 35 to label rooms in an automatically segmented 2D map.

In an embodiment, a time lapse of a 2D floorplan can be generated by taking into account that the relative positions between the different maps of the same location obtained at different times is known. By having all the maps generated by different mapping sessions correctly aligned using Monte Carlo techniques for example, the static parts of the map (such as walls) can be easily segmented out and distinguished from moving areas (doors, chairs, desks, etc.).

Figure 40:
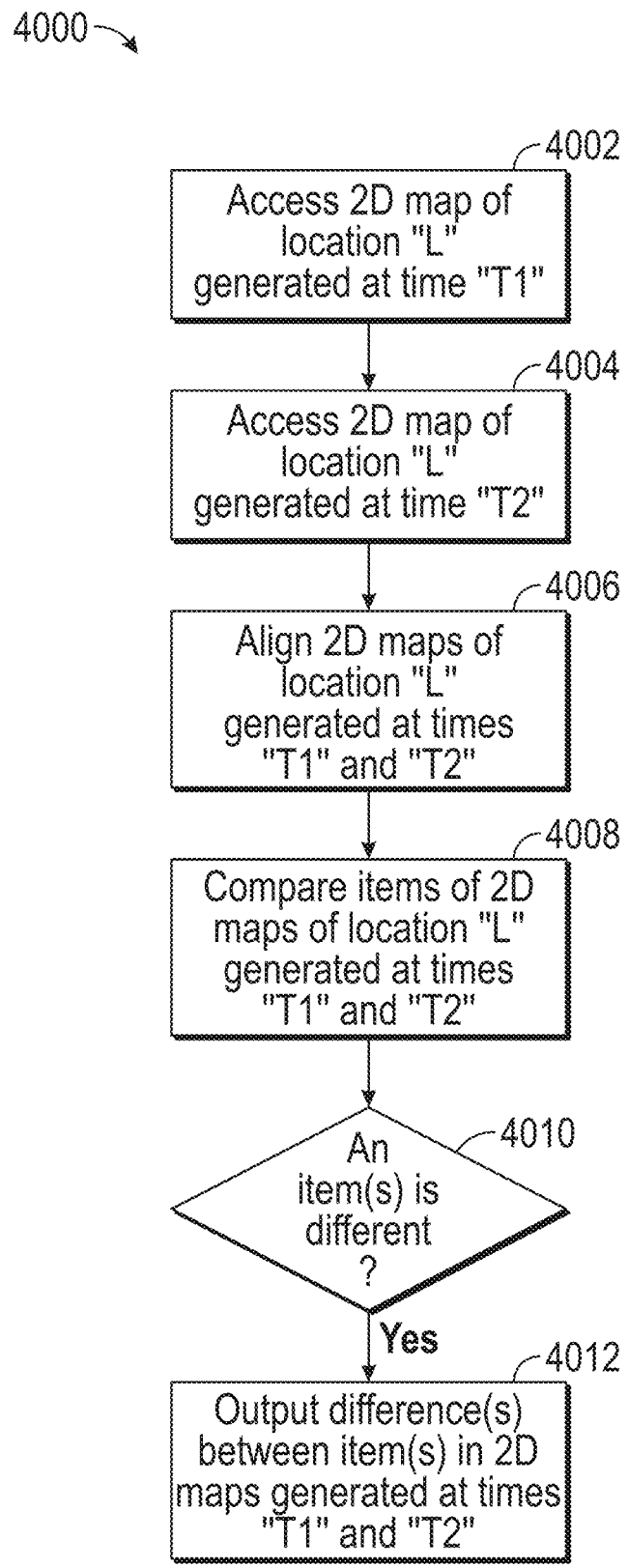
FIG. 40 is a flow diagram of a process for comparing items in 2D maps of the same location that were generated in two different mapping sessions in accordance with an embodiment.

Turning now to FIG. 40, a flow diagram 4000 of a process for comparing items in 2D maps of the same location that were generated during two different mapping sessions is generally shown in accordance with an embodiment. The process shown in FIG. 40 can be implemented by computer instructions executing on a processor. At block 4002, a 2D map of a location, "L", such as a floor of a building, recorded during a mapping session at time "T1" is accessed from the segmented 2D map database 316 along with its corresponding identified objects from the identified objects database 312. In an embodiment, the coordinates of the corresponding identified objects are expressed in terms of the coordinates of the 2D map of the location recorded at time T1. At block 4004, a 2D map of the same location, L, recorded during a mapping session at time "T2" is accessed from the segmented 2D map database 316 along with its corresponding identified objects from the identified objects database 312. In an embodiment, the coordinates of the corresponding identified objects are expressed in terms of the coordinates of the 2D map of the location recorded at time T2.

At block 4006, the 2D maps of location L, at times T1 and T2 are aligned using known methods such as a root-mean-square error (RMSE) metric in which the maps are aligned iteratively by trying different rotations and translations until the error between both maps is lower than pre-specified value. This includes aligning both the 2D maps as well as the identified objects corresponding to each of the 2D maps. The identified objects that are stationary such as, but not limited to doors and windows can be used to perform or to verify the alignment.

At block 4006 of FIG. 40, objects, or items, being tracked in the 2D map of location L generated at time T1 are compared to the objects being tracked in the 2D map of location L generated at time T2. If, as determined at block 4010, one or more items are different, then processing continues at block 4012 where the differences are output. The difference could be that an item in the 2D map generated at time T1 is not contained in the 2D map generated in time T2 or vice versa. Another difference could be that an item is in one location in the 2D map generated at time T1 and in a different location in the 2D map generated at time T2. In an embodiment, the differences between the object in the 2D maps is output to a user interface. In another embodiment, the differences are stored in a storage device.

In an embodiment, only a subset of identified objects in the identified objects database 312 corresponding to the 2D map generated at time T1 is compared to a subset of identified objects in the identified objects database 312 corresponding to the 2D map generated at time T2. For example, if the 2D maps are being generated for fire safety reasons, the subset of the identified objects can include items such as fire door signs, fire hoses, fire alarms, sprinklers, fire extinguishers, fire doors (e.g., to show that they are closed). In another example, if the 2D maps are being generated to show progress of an on-going building project then the subset of the identified objects can include items such as stationary objects such as windows, doors, and walls. In a further example, if the 2D maps are being generated to show progress in getting a building ready to be inhabited, the subset of the identified objects can include items such as stoves, refrigerators, couches, chairs, and lamps.

Figure 41:
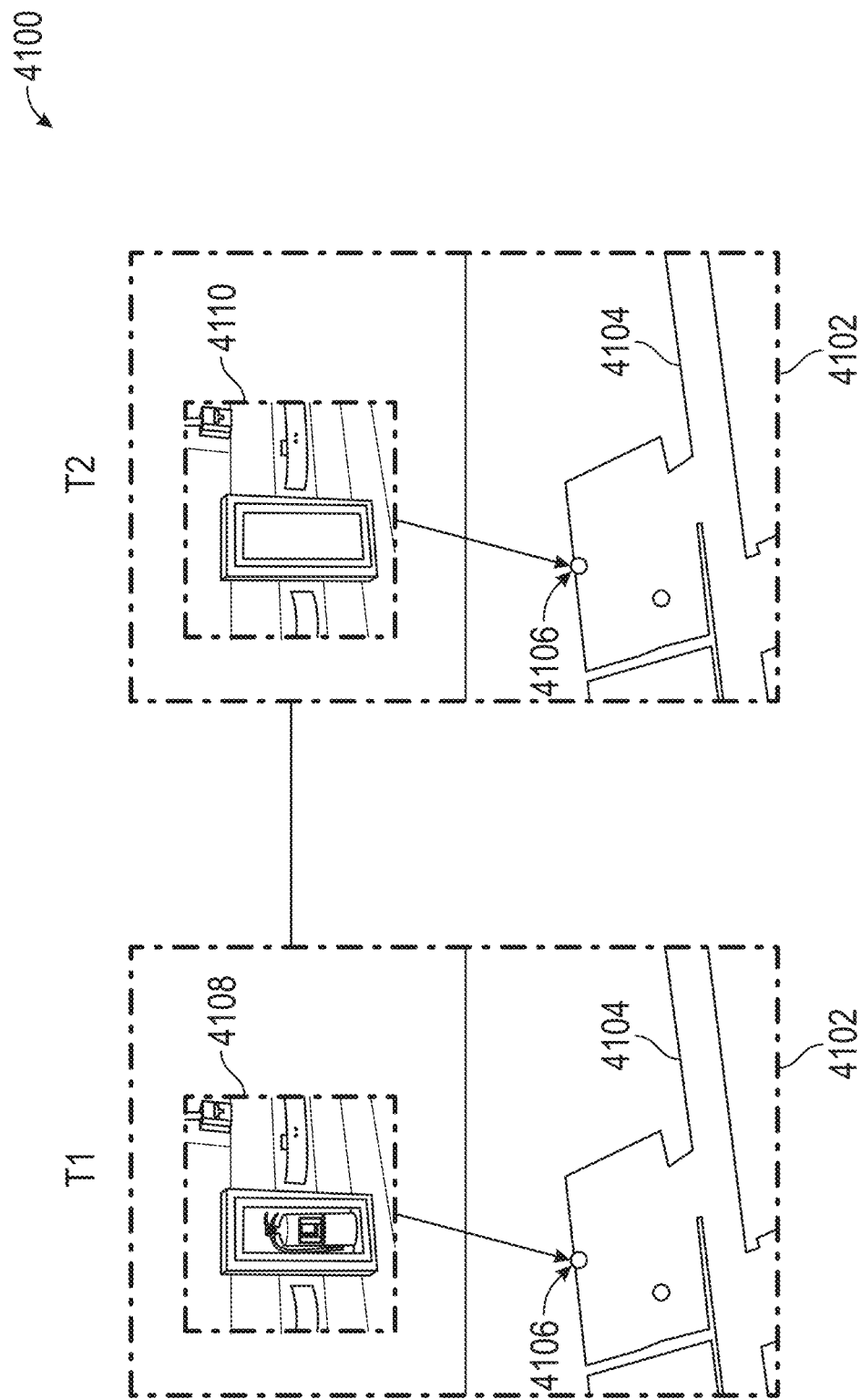
FIG. 41 is a view of 2D maps of a location generated during mapping sessions at times "T1" and "T2" in accordance with an embodiment.

Turning now to FIG. 41, a view 4100 of 2D maps of a location 4102 generated during mapping sessions at times T1 and T2 is generally shown in accordance with an embodiment. As shown in FIG. 41, at time T1, the location 4102 includes a cabinet with a fire extinguisher 4108 at location 4106 and a wall 4104. At time T2, the location 4102 includes a cabinet without a fire extinguisher 4110 at location 4106 and the wall 4104. In an embodiment, this difference would be output (e.g., via a display or email message and/or superimposed on the 2D map) and could also be saved in a storage device.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system of comparing two-dimensional (2D) maps of an environment, the system comprising:
a processor;
a memory comprising computer executable instructions that, when executed by the processor, cause the processor to perform operations, the operations comprising:
receiving a first 2D map of a location, the first 2D map generated at a first time based at least in part on first scan data from a coordinate measurement scanner and a portable computing device, the coordinate measurement scanner comprising a light source, a first image sensor, and a controller, and the portable computing device comprising a second image sensor, wherein the first 2D map is segmented based at least in part on a geometric element added, by the processor without user input, to the first 2D map prior to the segmenting, the geometric element representing an object in the first 2D map that was identified, by the processor, by applying image recognition to output from the second image sensor;
receiving a second 2D map of the location, the second 2D map generated at a second time based at least in part on second scan data from the coordinate measurement scanner and the portable computing device;
aligning the first 2D map and the second 2D map;
comparing contents of the first 2D map and the second 2D map; and
in response to determining differences between the contents, outputting the differences.

2. The system of claim 1, wherein the first 2D map comprises a first identified object at a first coordinate and the second 2D map comprises a second identified object at a second coordinate, the first identified object and the second identified object having a same object type, and the comparing contents comprises comparing the first identified object to the second identified object.

3. The system of claim 2, wherein the first identified object is identified by applying the image recognition to the output from the second image sensor.

4. The system of claim 3, wherein the image recognition is implemented based at least in part on a neural network.

5. The system of claim 2, wherein the same object type is one of a wall, a door, and a window.

6. The system of claim 2, wherein the first identified object and the second identified object are stationary objects.

7. The system of claim 2, wherein the first identified object and the second identified object are not stationary objects.

8. The system of claim 1, wherein the aligning comprises performing a root-mean-square error (RMSE) method.

9. The system of claim 1, wherein the first image sensor is arranged to receive light reflected from the object points, the controller being operable to determine a distance value to at least one of the object points.

10. The system of claim 9, wherein the portable computing device is coupled for communication to one or more processors that are responsive to correlate a location captured by a first image from the portable computing device with the location in the first 2D map or the second 2D map of the environment in response to the first image being acquired by the second image sensor.

11. A method of comparing two-dimensional (2D) maps of an environment, the method comprising:
receiving a first 2D map of a location, the first 2D map generated at a first time based at least in part on first scan data from a coordinate measurement scanner and a portable computing device, the coordinate measurement scanner comprising a light source, a first image sensor, and a controller, and the portable computing device comprising a second image sensor, wherein the first 2D map is segmented based at least in part on a geometric element added, by a processor without user input, to the first 2D map prior to the segmenting, the geometric element representing an object in the first 2D map that was identified, by the processor, by applying image recognition to output from the second image sensor;
receiving a second 2D map of the location, the second 2D map generated at a second time based at least in part on second scan data from the coordinate measurement scanner and the portable computing device;
aligning the first 2D map and the second 2D map;
comparing contents of the first 2D map and the second 2D map; and
in response to determining differences between the contents, outputting the differences.

12. The method of claim 11, wherein the first 2D map comprises a first identified object at a first coordinate and the second 2D map comprises a second identified object at a second coordinate, the first identified object and the second identified object having a same object type, and the comparing contents comprises comparing the first identified object to the second identified object.

13. The method of claim 12, wherein the first identified object is identified by applying the image recognition to the output from the second image sensor.

14. The method of claim 13, wherein the image recognition is implemented based at least in part on a neural network.

15. The method of claim 12, wherein the same object type is one of a wall, a door, and a window.

16. The method of claim 12, wherein the first identified object and the second identified object are stationary objects.

17. The method of claim 12, wherein the first identified object and the second identified object are not stationary objects.

18. The method of claim 11, wherein the aligning comprises performing a root-mean-square error (RMSE) method.

19. The method of claim 11, wherein the first image sensor is arranged to receive light reflected from the object points, the controller being operable to determine a distance value to at least one of the object points.

20. The method of claim 19, wherein the portable computing device is coupled for communication to one or more processors that are responsive to correlate a location captured by a first image from the portable computing device with the location in the first 2D map or the second 2D map of the environment in response to the first image being acquired by the second image sensor.

* * * * *